(12) United States Patent
Tan et al.

(10) Patent No.: US 9,998,364 B2
(45) Date of Patent: Jun. 12, 2018

(54) METHOD FOR PROCESSING PACKET AND FORWARDER

(71) Applicant: Huawei Technologies Co., Ltd., Shenzhen, Guangdong (CN)

(72) Inventors: Shiyong Tan, Beijing (CN); Hui Ni, Beijing (CN); Hui Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 14/966,307

(22) Filed: Dec. 11, 2015

(65) Prior Publication Data

US 2016/0099868 A1    Apr. 7, 2016

Related U.S. Application Data

(63) Continuation of application No. PCT/CN2013/077259, filed on Jun. 14, 2013.

(51) Int. Cl.
*H04L 12/721* (2013.01)
*H04L 12/64* (2006.01)
(Continued)

(52) U.S. Cl.
CPC .......... *H04L 45/38* (2013.01); *H04L 12/6418* (2013.01); *H04L 41/0806* (2013.01); *H04L 41/0893* (2013.01); *H04L 67/327* (2013.01)

(58) Field of Classification Search
CPC .............................. H04L 45/38; H04L 67/327
See application file for complete search history.

(56) References Cited

U.S. PATENT DOCUMENTS 8,448,238 B1    5/2013  Gupta et al.
9,319,241 B2 *  4/2016  Kang ................ H04L 12/56
(Continued)

FOREIGN PATENT DOCUMENTS

CN    102045327 A    5/2011
CN    102946325 A    2/2013
(Continued)

OTHER PUBLICATIONS

OpenFlow Switch Specification Version 1.3.2 (Wire Protocol 0x04); ONF TS-009; Apr. 25, 2013; 131 pages.
(Continued)

*Primary Examiner* — Andrew Lai
*Assistant Examiner* — Sumitra Ganguly

(57) ABSTRACT

Embodiments of the present invention provide a method for processing a packet in a software-defined network (Software-Defined Network), where the method is performed by a forwarder, and the method includes: receiving an input packet; determining a flow to which the input packet belongs according to the input packet; determining a context identifier set corresponding to the flow to which the input packet belongs according to a first correspondence between flows and context identifier sets, where a context identifier set corresponding to each flow in the first correspondence includes at least one context identifier; determining a context corresponding to the context identifier set according to a second correspondence between context identifiers and contexts; and processing the input packet according to the context corresponding to the context identifier set.

16 Claims, 5 Drawing Sheets

(51) Int. Cl.
*H04L 29/08* (2006.01)
*H04L 12/24* (2006.01)

(56) References Cited

U.S. PATENT DOCUMENTS

| | | | |
|---|---|---|---|
| 2005/0094670 A1* | 5/2005 | Kim | H04W 28/06 370/477 |
| 2008/0002579 A1* | 1/2008 | Lindholm | H04L 12/4641 370/230 |
| 2011/0019683 A1* | 1/2011 | Zhu | H04L 45/00 370/401 |
| 2012/0170592 A1 | 7/2012 | Dudkowski et al. | |
| 2012/0201140 A1 | 8/2012 | Suzuki et al. | |
| 2013/0058208 A1* | 3/2013 | Pfaff | H04L 12/4633 370/217 |
| 2013/0058215 A1 | 3/2013 | Koponen et al. | |
| 2013/0176888 A1 | 7/2013 | Kubota et al. | |
| 2014/0112344 A1 | 4/2014 | Mineshita | |
| 2014/0215562 A1* | 7/2014 | Roberson | H04L 63/1416 726/3 |

FOREIGN PATENT DOCUMENTS

| | | |
|---|---|---|
| CN | 103051557 A | 4/2013 |
| JP | 2013519250 A | 5/2013 |
| WO | 2011043312 A1 | 4/2011 |
| WO | 2012049960 A1 | 4/2012 |
| WO | 2012173172 A1 | 12/2012 |
| WO | WO 2012/177213 A2 | 12/2012 |

OTHER PUBLICATIONS

Maeda; "Additional functions and application examples of OpenFlow ver1.1 and ver1.2"; Feb. 23, 2012; https://thinkit.co.jp/story/2012/02/23/3388; 31 pages.

* cited by examiner

METHOD FOR PROCESSING PACKET AND FORWARDER

CROSS-REFERENCE TO RELATED APPLICATIONS

This application is a continuation of International Application No. PCT/CN2013/077259, filed on Jun. 14, 2013, which is hereby incorporated by reference in its entirety.

TECHNICAL FIELD

Embodiments of the present invention relate to the field of communications technologies, and in particular, to a method for processing a packet and a forwarder.

BACKGROUND

A software-defined network (SDN for short) intends to transform a conventional closed network into an open environment, and can also implement programming, as a computer does. The OpenFlow technology is a manner of implementing an SDN. The OpenFlow technology is proposed by Stanford University at the earliest, which aims to solve various bottlenecks generated when a current network is confronted with a new service with an innovative network interconnection idea based on an existing Transmission Control Protocol (TCP for short)/Internet Protocol (IP for short) technical condition. OpenFlow converts a packet forwarding processing process implemented originally and completely by a single network element into a process completed jointly by an OpenFlow forwarder and a controller, thereby implementing separation of data forwarding from service control. The controller controls a flow table in the OpenFlow forwarder by using a standard interface, that is, the OpenFlow protocol, thereby implementing centralized control over an entire network.

One of the most important components in the OpenFlow forwarder is a flow table, the flow table is formed by a large quantity of flow table entries, and each flow table entry is a packet processing rule. After receiving a packet, the forwarder may obtain an action needing to be executed by querying a flow table entry. The forwarder may include multiple flow tables, and the controller delivers a flow table entry specific to a service flow for one or more flow tables of the forwarder.

Each OpenFlow flow table entry is formed by flow information (such as, flow match field), a counter and an action (Action). For details, reference is made to what is shown in Table 1 as follows:

TABLE 1

| Flow match field | Counter | Action |
| --- | --- | --- |

The flow match field in Table 1 is match information formed by multiple fields, is an identifier of a flow table entry, and may be used for defining a flow. Table 2 shows an example of a flow match field, and the flow match field is formed by ten fields.

The counter in Table 1 is used for counting traffic related data, and the counter may perform individual setting according to each flow table, each flow or each port.

The action in Table 1 indicates a type of an action that should be executed on a packet matching the flow table entry, for example, an action type such as forwarding or dropping. Action types defined in the current Openflow protocol include:

Output: forwarding a packet from a specific port;

Set-Queue: forwarding a packet by using a specific forwarding queue;

Drop: dropping a packet;

Group: grouping multiple flows into an action to perform processing;

Push-Tag/Pop-Tag: performing encapsulation or de-encapsulation;

Set-Field: changing a packet header; and

Change-TTL: changing a TTL field.

Action modes of a current flow table include two types: an active mode and a passive mode. In the active mode, a controller delivers flow table information collected by the controller to a forwarder actively, and subsequently the forwarder may directly perform forwarding according to a flow table; the passive mode refers to that when having not found any matching flow table entry record after receiving a packet, a forwarder forwards the packet to a controller, and the controller decides how to perform processing, and delivers a corresponding flow table entry to the forwarder.

In a flow table of the conventional technology, a flow and an action are directly associated, and when actions corresponding to some flows are the same, a corresponding action needs to be saved in a flow table entry for each flow, and therefore a large quantity of redundancy occurs in information stored in a forwarder, and maintenance is also very difficult. For example, when an action is changed, related flow table entries need to be all changed.

SUMMARY

Embodiments of the present invention provide a method for processing a packet in an SDN and a forwarder, where the method is used for reducing redundancy information stored in the forwarder, and improving a capability of the forwarder for processing a packet.

According to a first aspect, a method for processing a packet in an SDN is provided, where the method is performed by a forwarder, and specifically includes:

receiving an input packet;

determining a flow to which the input packet belongs according to the input packet;

determining a context identifier set corresponding to the flow to which the input packet belongs according to a first correspondence between flows and context identifier sets, where a context identifier set corresponding to each flow in the first correspondence includes at least one context identifier;

TABLE 2

| Exchange port | VLAN identifier | MAC source address | MAC destination address | Ethernet type | IP source address | IP destination address | IP port | TCP source address | TCP destination address |
| --- | --- | --- | --- | --- | --- | --- | --- | --- | --- | determining a context corresponding to the context identifier set according to a second correspondence between context identifiers and contexts; and processing the input packet according to the context corresponding to the context identifier set.

With reference to the first aspect, in a first possible implementation manner of the first aspect, wherein the determining a flow to which the input packet belongs according to the input packet comprises:

determining the flow to which the input packet belongs according to a packet header or content of the input packet.

With reference to the first aspect or the first possible implementation manner of the first aspect, in a second possible implementation manner of the first aspect, wherein before the determining a context identifier set corresponding to the flow to which the input packet belongs according to a first correspondence, the method further comprises:

determining whether the first correspondence has the context identifier set corresponding to the flow to which the input packet belongs; and if yes, performing the step of determining a context identifier set corresponding to the flow to which the input packet belongs according to a first correspondence; or if not, performing the following steps:

sending a flow rule request message to a controller, wherein the flow rule request message comprises the packet header or content of the input packet;

receiving a flow rule installation message sent by the controller, wherein the flow rule installation message comprises the context identifier set corresponding to the flow of the input packet; and adding, to the first correspondence, information about the flow to which the input packet belongs, and the context identifier set corresponding to the flow of the input packet.

With reference to the second possible implementation manner of the first aspect, in a third possible implementation manner of the first aspect, wherein the flow rule installation message sent by the controller further comprises the context corresponding to the context identifier set; and after the forwarder receives the flow rule installation message, if it is found that some or all context identifiers in the context identifier set, and contexts corresponding to the some or all context identifiers in the context identifier set are not stored in the second correspondence, the some or all context identifiers in the context identifier set, and the contexts corresponding to the some or all context identifiers in the context identifier set are added to the second correspondence.

With reference to the first aspect or the first possible implementation manner of the first aspect, in a fourth possible implementation manner of the first aspect, wherein before the determining a context corresponding to the context identifier set according to a second correspondence between context identifiers and contexts, the method further comprises:

determining whether the second correspondence has the context corresponding to the context identifier set; and if yes, performing the step of determining a context corresponding to the context identifier set according to a second correspondence; or if some or all context identifiers in the context identifier set have no corresponding context, performing the following steps:

sending a context request message to the controller, wherein the context request message comprises the some or all context identifiers in the context identifier set;

receiving a context installation message sent by the controller, wherein the context installation message comprises the some or all context identifiers in the context identifier set, and contexts corresponding to the some or all context identifiers in the context identifier set; and adding, to the second correspondence, the some or all context identifiers in the context identifier set, and the contexts corresponding to the some or all context identifiers in the context identifier set.

With reference to the first aspect or all the former possible implementation manner of the first aspect, in a fifth possible implementation manner of the first aspect, wherein when the context identifier set comprises multiple context identifiers, the processing the input packet according to the context corresponding to the context identifier set is performed in a preset context sequence.

With reference to the fifth possible implementation manner of the first aspect, in a sixth possible implementation manner of the first aspect, wherein if the preset context sequence comprises a case in which at least two contexts are the same in sequence, the forwarder processes the input packet according to both of the at least two contexts.

With reference to the first aspect or all the former possible implementation manner of the first aspect, in a seventh possible implementation manner of the first aspect, wherein the method further comprises:

receiving a flow deletion message sent by the controller, wherein the flow deletion message comprises information about a to-be-deleted flow; and deleting, from the first correspondence, the information about the to-be-deleted flow, and a context identifier set corresponding to the to-be-deleted flow.

With reference to the seventh possible implementation manner of the first aspect, in a eighth possible implementation manner of the first aspect, wherein if some or all context identifiers corresponding to the deleted flow are not corresponding to other flows, the method further comprises:

deleting, from the second correspondence, the some or all context identifiers corresponding to the deleted flow, and contexts corresponding to the some or all context identifiers corresponding to the deleted flow.

With reference to the first aspect or all the former possible implementation manner of the first aspect, in a ninth possible implementation manner of the first aspect, wherein the method further comprises:

receiving a context deletion message sent by the controller, wherein the context deletion message comprises at least one to-be-deleted context identifier; and deleting, from the second correspondence, the at least one to-be-deleted context identifier, and a context corresponding to the at least one to-be-deleted context identifier.

With reference to the ninth possible implementation manner of the first aspect, in a tenth possible implementation manner of the first aspect, wherein after the deleting a context corresponding to the at least one to-be-deleted context identifier, the method further comprises:

deleting a context identifier corresponding to the deleted context from the first correspondence.

With reference to the tenth possible implementation manner of the first aspect, in a eleventh possible implementation manner of the first aspect, wherein after the deleting a context identifier corresponding to the deleted context from the first correspondence, the method further comprises:

deleting, from the first correspondence, information about a flow corresponding to the deleted context identifier.

With reference to the first aspect or all the former possible implementation manner of the first aspect, in a twelfth possible implementation manner of the first aspect, in a sixth possible implementation manner of the first aspect, wherein the method further comprises:

obtaining a context processing result after the input packet is processed.

With reference to the twelfth possible implementation manner of the first aspect, in a thirteenth possible implementation manner of the first aspect, wherein the method further comprises:

sending the context processing result to the controller.

With reference to the thirteenth possible implementation manner of the first aspect, in a fourteenth possible implementation manner of the first aspect, wherein the method further comprises:

receiving a newly determined flow and a newly determined context identifier set that are determined by the controller for the input packet, so as to further process the input packet according to a context corresponding to the newly determined context identifier set.

With reference to the twelfth possible implementation manner of the first aspect, in a fifteenth possible implementation manner of the first aspect, wherein if the context processing result is a newly generated packet, the method further comprises:

determining a flow to which the newly generated packet belongs according to the newly generated packet;

determining a new context identifier set corresponding to the flow to which the newly generated packet belongs according to the first correspondence;

determining a context corresponding to the new context identifier set according to the second correspondence; and processing the newly generated packet according to the context corresponding to the new context identifier set.

With reference to the first aspect or all the former possible implementation manner of the first aspect, in a sixteenth possible implementation manner of the first aspect, wherein:

the some or all context identifiers in the context identifier set corresponding to the flow of the input packet are further corresponding to other flows.

With reference to the first aspect or all the former possible implementation manner of the first aspect, in a seventeenth possible implementation manner of the first aspect, wherein the context identifier is further used to indicate a context type of each context, and the context type comprises no action type.

According to a second aspect, a forwarder used in a software-defined network (Software-Defined Network) is provided, wherein the forwarder comprises an interface, a processor and a memory:

the memory is configured to store a first correspondence between flows and context identifier sets, and a second correspondence between context identifiers and contexts, wherein a context identifier set corresponding to each flow in the first correspondence comprises at least one context identifier;

the interface is configured to receive an input packet; and the processor is configured to determine a flow to which the input packet belongs according to the input packet; determine a context identifier set corresponding to the flow to which the input packet belongs according to the first correspondence stored in the memory; determine a context corresponding to the context identifier set according to the second correspondence stored in the memory; and process the input packet according to the context corresponding to the context identifier set.

With reference to the second aspect, in a first possible implementation manner of the second aspect, wherein that the processor is configured to determine a flow to which the input packet belongs according to the input packet is specifically that:

the processor is configured to determine the flow corresponding to the input packet according to a packet header or content of the input packet.

With reference to the second aspect or the first possible implementation manner of the second aspect, in a second possible implementation manner of the second aspect, wherein the interface comprises a receiver and a sender; and that the interface is configured to receive an input packet is specifically that:

the receiver in the interface is configured to receive the input packet.

With reference to the second possible implementation manner of the second aspect, in a third possible implementation manner of the second aspect, wherein the processor is further configured to: before the context identifier set corresponding to the flow to which the input packet belongs is determined according to the first correspondence stored in the memory, determine whether the first correspondence has the context identifier set corresponding to the flow to which the input packet belongs; and if yes, determine the context identifier set corresponding to the flow to which the input packet belongs according to the first correspondence; or if not, notify the sender;

the sender is configured to: after a notification of the processor is received, send a flow rule request message to a controller, wherein the flow rule request message comprises the packet header or content of the input packet;

the receiver is further configured to receive a flow rule installation message sent by the controller, wherein the flow rule installation message comprises the context identifier set corresponding to the flow of the input packet; and the processor is further configured to add, to the first correspondence, information about the flow to which the input packet belongs, and the context identifier set corresponding to the flow of the input packet.

With reference to the second possible implementation manner of the second aspect, in a fourth possible implementation manner of the second aspect, wherein the processor is further configured to: before the context corresponding to the context identifier set corresponding to the flow to which the input packet belongs is determined according to the second correspondence stored in the memory, determine whether the second correspondence has the context corresponding to the context identifier set corresponding to the flow to which the input packet belongs; and if yes, determine the context corresponding to the context identifier set according to the second correspondence stored in the memory; or if some or all context identifiers in the context identifier set have no corresponding context, notify the sender;

the sender is configured to send a context request message to the controller, wherein the context request message comprises the some or all context identifiers in the context identifier set corresponding to the flow to which the input packet belongs;

the receiver is further configured to receive a context installation message sent by the controller, wherein the context installation message comprises the some or all context identifiers in the context identifier set, and contexts corresponding to the some or all context identifiers in the context identifier set; and the processor is further configured to add, to the second correspondence, the some or all context identifiers in the context identifier set, and the contexts corresponding to the some or all context identifiers in the context identifier set.

With reference to the second aspect or the first possible implementation manner of the second aspect, in a fifth possible implementation manner of the second aspect, wherein if there are multiple flows to which the input packet belongs, that the processor is configured to determine the context identifier set corresponding to the flow to which the input packet belongs according to the first correspondence between flows and context identifier sets is specifically that:

the processor is configured to obtain a context identifier set corresponding to each flow to which the input packet belongs sequentially according to the first correspondence.

With reference to the second aspect or the first possible implementation manner of the second aspect, in a sixth possible implementation manner of the second aspect, wherein when the context identifier set comprises multiple context identifiers, the processor is configured to process, in a preset context sequence, the input packet according to the context corresponding to the context identifier set.

With reference to the sixth possible implementation manner of the second aspect, in a seventh possible implementation manner of the second aspect, wherein if the preset context sequence comprises a case in which at least two contexts are the same in sequence, the processor is further configured to process the input packet according to both of the at least two contexts.

With reference to the second aspect or all the former possible implementation manner of the second aspect, in a eighth possible implementation manner of the second aspect, wherein the receiver is further configured to receive a flow deletion message sent by the controller, wherein the flow deletion message comprises information about a to-be-deleted flow; and the processor is further configured to delete, from the first correspondence, the information about the to-be-deleted flow, and a context identifier set corresponding to the to-be-deleted flow.

With reference to the eighth possible implementation manner of the second aspect, in a ninth possible implementation manner of the second aspect, wherein the processor is further configured to: if it is found that some or all context identifiers corresponding to the deleted flow are not corresponding to other flows, delete, from the second correspondence, the some or all context identifiers corresponding to the deleted flow, and contexts corresponding to the some or all context identifiers corresponding to the deleted flow.

With reference to any one of the second to the ninth possible implementation manner of the second aspect, in a tenth possible implementation manner of the second aspect, wherein the processor is further configured to:

obtain a context processing result obtained after the input packet is processed.

With reference to the tenth possible implementation manner of the second aspect, in a eleventh possible implementation manner of the second aspect, wherein the sender is configured to send, by using a reporting message, the context processing result obtained by the processor to the controller.

With reference to the eleventh possible implementation manner of the second aspect, in a twelfth possible implementation manner of the second aspect, wherein the receiver is further configured to receive a newly determined flow and a newly determined context identifier set that are determined by the controller for the input packet, so as to instruct the processor to further process the input packet according to a context corresponding to the newly determined context identifier set.

With reference to the tenth possible implementation manner of the second aspect, in a thirteenth possible implementation manner of the second aspect, wherein the processor is further configured to:

if the context processing result is a newly generated packet, determine a flow to which the newly generated packet belongs according to the newly generated packet;

determine a new context identifier set corresponding to the flow to which the newly generated packet belongs according to the first correspondence;

determine a context corresponding to the new context identifier set according to the second correspondence; and process the newly generated packet according to the context corresponding to the new context identifier set.

According to a third aspect, a method for processing a packet in a software-defined network (Software-Defined Network) is provide, wherein the method is performed by a forwarder, and the method comprises:

receiving an input packet;

determining a flow to which the input packet belongs according to the input packet;

determining whether a first correspondence between flows and context identifier sets has a context identifier set corresponding to the flow to which the input packet belongs; and if yes, determining the context identifier set corresponding to the flow to which the input packet belongs according to the first correspondence; or if not, sending a flow rule request message to a controller, wherein the flow rule request message comprises a packet header or content of the input packet; and receiving a flow rule installation message sent by the controller, wherein the flow rule installation message comprises the context identifier set corresponding to the flow of the input packet;

determining a context corresponding to the context identifier set according to a second correspondence between context identifiers and contexts; and processing the input packet according to the context corresponding to the context identifier set.

With reference to the third aspect, in a first possible implementation manner of the third aspect, wherein the determining a flow to which the input packet belongs according to the input packet comprises:

determining the flow to which the input packet belongs according to a packet header or content of the input packet.

With reference to the third aspect, in a second possible implementation manner of the third aspect, wherein the method further comprises: after the flow rule installation message sent by the controller is received, adding, to the first correspondence, information about the flow to which the input packet belongs, and the context identifier set corresponding to the flow of the input packet.

With reference to the third aspect or all the former possible implementation manner of the third aspect, in a third possible implementation manner of the first aspect, wherein the flow rule installation message sent by the controller further comprises the context corresponding to the context identifier set; and after the forwarder receives the flow rule installation message, if it is found that some or all context identifiers in the context identifier set, and contexts corresponding to the some or all context identifiers in the context identifier set are not stored in the second correspondence, the some or all context identifiers in the context identifier set, and the contexts corresponding to the some or all context identifiers in the context identifier set are added to the second correspondence.

With reference to the third aspect or all the former possible implementation manner of the third aspect, in a fourth possible implementation manner of the first aspect, wherein before the determining a context corresponding to the context identifier set according to a second correspondence between context identifiers and contexts, the method further comprises:

determining whether the second correspondence has the context corresponding to the context identifier set; and if yes, performing the step of determining a context corresponding to the context identifier set according to a second correspondence; or if some or all context identifiers in the context set have no corresponding context, performing the following steps:

sending a context request message to the controller, wherein the context request message comprises the some or all context identifiers in the context identifier set;

receiving a context installation message sent by the controller, wherein the context installation message comprises the some or all context identifiers in the context identifier set, and contexts corresponding to the some or all context identifiers in the context identifier set; and adding, to the second correspondence, the some or all context identifiers in the context identifier set, and the contexts corresponding to the some or all context identifiers in the context identifier set.

With reference to the third aspect or the former possible implementation manner of the third aspect, in a fifth possible implementation manner of the first aspect, wherein the method further comprises: when the context identifier set comprises multiple context identifiers, performing, in a preset context sequence, the processing the input packet according to the context corresponding to the context identifier set.

With reference to the fifth possible implementation manner of the third aspect, in a sixth possible implementation manner of the first aspect, wherein the method further comprises: if the preset context sequence comprises a case in which at least two contexts are the same in sequence, processing, by the forwarder, the input packet according to both of the at least two contexts.

With reference to the third aspect or the former possible implementation manner of the third aspect, in a seventh possible implementation manner of the first aspect, wherein the method further comprises: wherein the method further comprises:

obtaining a context processing result after the input packet is processed.

With reference to the seventh possible implementation manner of the third aspect, in a eighth possible implementation manner of the first aspect, wherein the method further comprises:

sending the context processing result to the controller.

With reference to the seventh possible implementation manner of the third aspect, in a ninth possible implementation manner of the first aspect, wherein if the context processing result is a newly generated packet, the method further comprises:

determining a flow to which the newly generated packet belongs according to the newly generated packet;

determining a new context identifier set corresponding to the flow to which the newly generated packet belongs according to the first correspondence;

determining a context corresponding to the new context identifier set according to the second correspondence; and processing the newly generated packet according to the context corresponding to the new context identifier set.

With reference to the third aspect or the former possible implementation manner of the third aspect, in a tenth possible implementation manner of the first aspect, wherein the method further comprises:

the some or all context identifiers in the context identifier set corresponding to the flow of the input packet are further corresponding to other flows.

With reference to the third aspect or the former possible implementation manner of the third aspect, in a eleventh possible implementation manner of the first aspect, wherein the context identifier is further used to indicate a context type of each context, and the context type comprises no action type.

According to a fourth aspect, a forwarder used in a software-defined network (Software-Defined Network) is provided, wherein the forwarder comprises an interface, a processor and a memory;

the memory is configured to store a first correspondence between flows and context identifier sets, and a second correspondence between context identifiers and contexts, wherein a context identifier set corresponding to each flow in the first correspondence comprises at least one context identifier;

the interface is configured to receive an input packet; and the processor is configured to: determine whether the first correspondence stored in the memory has a context identifier set corresponding to a flow to which the input packet belongs; and if yes, determine the context identifier set corresponding to the flow to which the input packet belongs according to the first correspondence; or if not, notify the interface;

the interface is configured to: after a notification of the processor is received, send a flow rule request message to a controller, wherein the flow rule request message comprises the packet header or content of the input packet;

the interface is further configured to receive a flow rule installation message sent by the controller, wherein the flow rule installation message comprises the context identifier set corresponding to the flow of the input packet; and the processor is further configured to determine a context corresponding to the context identifier set according to the second correspondence stored in the memory; and process the input packet according to the context corresponding to the context identifier set.

With reference to the fourth aspect, in a first possible implementation manner of the fourth aspect, wherein the interface comprises a receiver and a sender; and that the interface is configured to receive an input packet is specifically that:

the receiver in the interface is configured to receive the input packet.

With reference to the first possible implementation manner of the fourth aspect, in a second possible implementation manner of the fourth aspect, wherein the processor is further configured to: before the context corresponding to the context identifier set corresponding to the flow to which the input packet belongs is determined according to the second correspondence stored in the memory, determine whether the second correspondence has the context corresponding to the context identifier set corresponding to the flow to which the input packet belongs; and if yes, determine the context corresponding to the context identifier set according to the second correspondence stored in the memory; or if some or all context identifiers in the context identifier set have no corresponding context, notify the sender;

the sender is further configured to send a context request message to the controller after the notification of the processor is received, wherein the context request message comprises the some or all context identifiers in the context identifier set corresponding to the flow to which the input packet belongs;

the receiver is further configured to receive a context installation message sent by the controller, wherein the context installation message comprises the some or all context identifiers in the context identifier set, and contexts corresponding to the some or all context identifiers in the context identifier set; and the processor is further configured to add, to the second correspondence, the some or all context identifiers in the context identifier set, and the contexts corresponding to the some or all context identifiers in the context identifier set.

With reference to the fourth aspect or the first possible implementation manner of the fourth aspect, in a third possible implementation manner of the fourth aspect, wherein when the context identifier set comprises multiple context identifiers, the processor is configured to process, in a preset context sequence, the input packet according to the context corresponding to the context identifier set.

With reference to the third possible implementation manner of the fourth aspect, in a fourth possible implementation manner of the fourth aspect, wherein if the preset context sequence comprises a case in which at least two contexts are the same in sequence, the processor is further configured to process the input packet according to both of the at least two contexts.

With reference to any one of the first to the fourth possible implementation manner of the fourth aspect, in a fifth possible implementation manner of the fourth aspect, wherein the receiver is further configured to receive a flow deletion message sent by the controller, wherein the flow deletion message comprises information about a to-be-deleted flow; and the processor is further configured to delete, from the first correspondence, the information about the to-be-deleted flow, and a context identifier set corresponding to the to-be-deleted flow.

With reference fifth possible implementation manner of the fourth aspect, in a sixth possible implementation manner of the fourth aspect, wherein the processor is further configured to: if it is found that some or all context identifiers corresponding to the deleted flow are not corresponding to other flows, delete, from the second correspondence, the some or all context identifiers corresponding to the deleted flow, and contexts corresponding to the some or all context identifiers corresponding to the deleted flow.

With reference to any one of the first to the sixth possible implementation manner of the fourth aspect, in a seventh possible implementation manner of the fourth aspect, wherein the processor is further configured to:

obtain a context processing result obtained after the input packet is processed.

With reference to the seventh possible implementation manner of the fourth aspect, in a eighth possible implementation manner of the fourth aspect, wherein the sender is configured to send, by using a reporting message, the context processing result obtained by the processor to the controller.

With reference to the eighth possible implementation manner of the fourth aspect, in a ninth possible implementation manner of the fourth aspect, wherein the receiver is further configured to receive a newly determined flow and a newly determined context identifier set that are determined by the controller for the input packet, so as to instruct the processor to further process the input packet according to a context corresponding to the newly determined context identifier set.

With reference to the seventh possible implementation manner of the fourth aspect, in a tenth possible implementation manner of the fourth aspect, wherein the processor is further configured to:

if the context processing result is a newly generated packet, determine a flow to which the newly generated packet belongs according to the newly generated packet;

determine a new context identifier set corresponding to the flow to which the newly generated packet belongs according to the first correspondence;

determine a context corresponding to the new context identifier according to the second correspondence; and process the newly generated packet according to the context corresponding to the new context identifier.

In the embodiments of the present invention, a flow is corresponding to a context identifier set, a flow is not directly associated with a context, and even when multiple flows share a context, this context does not need to be saved for multiple times, and under a hardware condition the same as that in the conventional technology, a storage capability and a processing capability of a forwarder are greatly improved in the embodiments of the present invention.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
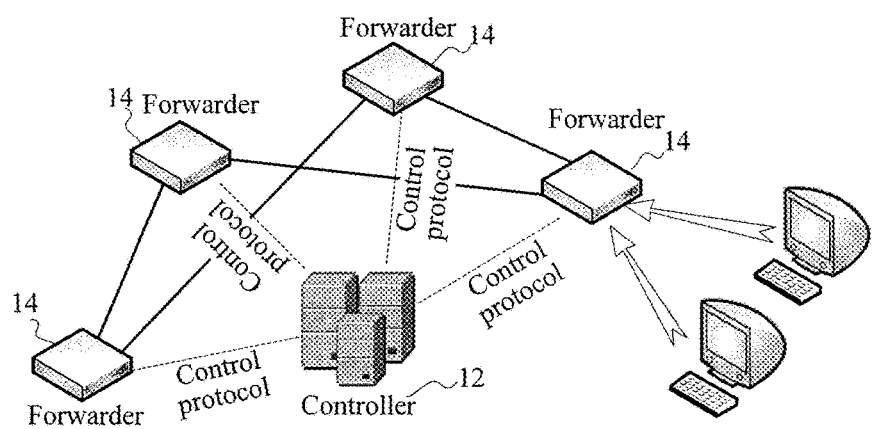
FIG. 1 is a schematic architectural diagram of an SDN according to an embodiment of the present invention.

FIG. 1 is a schematic structural diagram of an SDN, and the SDN at least includes a forwarder 14 and a controller 12. The forwarder 14 is responsible for forwarding of a data layer; the controller 12 is responsible for performing centralized control over a network, and implementing a function of a control layer. The forwarder 14 communicates with the controller 12 by using a control protocol. One forwarder may be connected to one or more other forwarders, and may also be connected to one or more entities for sending/receiving a packet (such as, a fixed terminal, a mobile terminal, and a personal computer).

Figure 2:
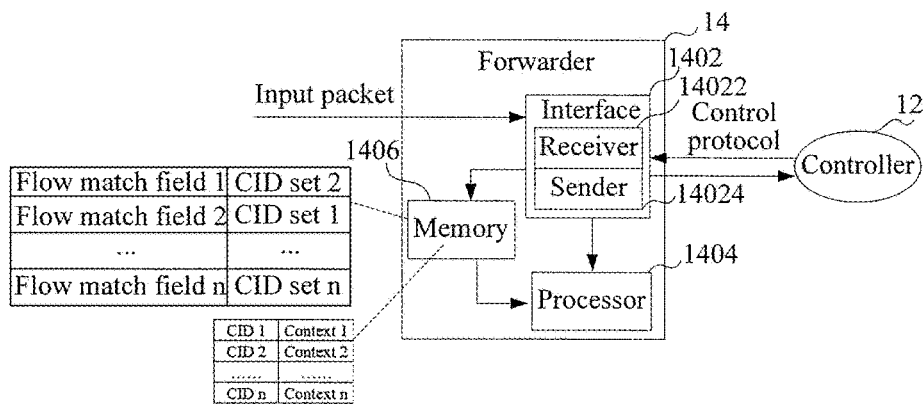
FIG. 2 is a schematic constituent diagram of a forwarder according to an embodiment of the present invention.

FIG. 2 is a schematic constituent diagram of a forwarder, and the forwarder 14 includes an interface 1402, a processor 1404 and a memory 1406. The forwarder 14 communicates with a controller 12 or other network entities by using the interface 1402. The interface 1402 is configured to receive a message, information, a packet or data from the controller 12 or other network entities; or is configured to send a message, information, a packet or data to the controller 12 or other network entities. The processor 1404 may perform some corresponding processing on the message, information, packet or data received by the interface 1402. The memory 1406 may be configured to store information about a flow and a context. In addition, the memory 1406 may be further configured to store other information, for example, be configured to store a message, information, a packet or data received by a receiver 14022, or store a processing result of the processor 1404. The information about a flow and a context stored in the memory 1406 also includes: a first correspondence between flows and context identifier (CID for short) sets, and a second correspondence between CIDs and contexts.

For ease of description, the first correspondence between flows and CID sets is referred to as a flow table in the following, and this name: "flow table" is not used to limit a storage form of the first correspondence, since when the memory 1406 stores the first correspondence, a table form may be used, and other forms may also be used, such as, a form in which a storage unit is mapped to one or more other storage units.

The memory 1406 may store one or more flow tables. Table 3 is a schematic structural diagram of a flow table in the embodiment of the present invention. The flow table shown in Table 3 is different from the flow table of the conventional technology shown in Table 1. Each flow of the flow table of the conventional technology is directly associated with an Action, while each flow in the flow table of this embodiment of the present invention is associated with a CID, and is not directly associated with a context.

A correspondence between information (such as, a flow match field) about each flow in the flow table and a CID set may be referred to as a flow table entry, as shown in Table 3. The flow match field is used for identifying a flow, the flow match field includes information needed for identifying a flow to which a packet belongs, and the structure thereof may include any combination of different tuples shown in Table 2, and may also include other content, such as: a multiprotocol label switching (Multiprotocol Label Switching, MPLS for short) identifier, a differentiated services code point (differentiated services code point, DSCP for short) code, a transfer layer protocol type, a generic routing encapsulation identifier (Generic Routing Encapsulation Identifier, GRE ID for short), a tunnel endpoint identifier of GPRS tunneling protocol (tunnel endpoint identifier of GPRS tunneling protocol, GTP TEID for short) and the like, or be formed by using a packet offset value, a match length and the like.

Each flow in Table 3 is corresponding to a CID set, and each CID set includes at least one CID. A CID is used to uniquely identify a context, and may have many representation forms, which may, for example, be a character of any carry system, a digit, a letter, a digit plus a letter, and a digit plus other characters. In addition, a CID may be further used to indicate a type of a context.

TABLE 3

| Flow match field 1 | CID set 1 |
|---|---|
| Flow match field 2 | CID set 2 |
| ... | ... |
| Flow match field n | CID set n |

Besides the foregoing flow table, the memory 1406 further saves the second correspondence between CIDs and contexts. For ease of description, the second correspondence between CIDs and contexts is referred to as a context list in the following, and likewise, this name is not used to limit a storage form of the second correspondence, because when the memory 1406 stores the second correspondence, a table form may be used, and other forms may also be used, for example, a form in which a storage unit is mapped to one or more other storage units.

Table 4 is a schematic structural diagram of a context list in an embodiment of the present invention. Each CID in Table 4 is corresponding to a context. A context includes information needed for processing a packet.

Besides including the information needed for processing a packet, an Action of the conventional technology further includes a type of a packet (Action Type), while in this embodiment of the present invention, the forwarder may already know a type of a corresponding context by using a CID, and therefore the context does not include such information similar to the Action Type anymore. There are many context types, and in the implementation of the present invention, besides including action types (such as packet forwarding and packet dropping) of the conventional technology, a context type indicated by a CID may further include other types, so that the forwarder may process an input packet in a diversified manner. For example, the context types may further include bandwidth control, deep packet inspection (Deep Packet Inspection, DPI), online charging, offline charging, firewall processing, network address translation (Network Address Translation, NAT), lawful interception, packet reassembly, link detection (such as detection performed based on the Bidirectional Forwarding Detection Protocol (Bidirectional Forwarding Detection Protocol, BFDP), the Link Layer Discovery Protocol (Link Layer Discovery Protocol, LLDP) or the like), and the like. Different context types are also corresponding to different contexts, for example, a context of a bandwidth control type may include an allowed maximum bandwidth, a guaranteed bandwidth, a forwarding priority, and the like; a context of an offline charging type may include a group identifier of an offline charging group, a charging information reporting interval, and the like; while a context of a routing and forwarding type may include a forwarding port number, a source MAC address or destination MAC address, and the like.

TABLE 4

| CID 1 | Context 1 |
|-------|-----------|
| CID 2 | Context 2 |
| ... | ... |
| CID n | Context n |

If different flows need to be processed according to a same context, only a CID corresponding to the context is repetitively saved in a flow table, and the context does not need to be repetitively saved. For example, the forwarder only needs to save the CID corresponding to the context into a CID set corresponding to each flow in the flow table, and the context only needs to be saved once in a correspondence between CIDs and contexts. In this way, more storage space may be saved for the forwarder, and the saved storage space may also enable the forwarder to store more contexts, and therefore, under a condition the same as that in the conventional technology, the forwarder in this embodiment of the present invention may store more contexts, and may also support more context types for packet processing.

In addition, in this embodiment of the present invention, context processing performed on a packet may be used for implementing processing logic more complex than the existing Action. In the conventional technology, when an OpenFlow forwarder performs an action, only a current packet is processed, and the forwarder does not perform state maintenance on a processed packet, and therefore the action can only be used to perform stateless handling (stateless handling) on a single packet, but cannot perform a stateful handling on a subsequent packet according to a previous packet processing result of a flow. However, the previous packet processing result is necessary for some complex processing behaviors, such as packet reordering, DPI, and virus detection. Therefore, in view of limitation on current action design, the OpenFlow forwarder in the conventional technology is only applicable to performing a comparatively simple action on a packet, but cannot implement a complex action. The forwarder in this embodiment of the present invention may save a state after packet processing by using a context processing unit, and thereby may perform more complex processing on a packet.

For ease of understanding, the forwarder provided in the present invention is elaborated below by using a specific example.

For example, referring to FIG. 2, the interface 1402 of the forwarder 14 may include a receiver 14022 configured to receive an input packet. The input packet may be sent by another forwarder, and may also be sent by another entity (such as, a computer, a mobile terminal, or a fixed terminal).

The processor 1404 is configured to determine a flow to which the input packet belongs, such as, determine a flow to which the input packet belongs according to a packet header or content of the input packet.

The processor 1404 is further configured to determine a CID set corresponding to the flow to which the input packet belongs according to the first correspondence stored in the memory 1406; and determine a context corresponding to the CID set according to the second correspondence stored in the memory 1406, and process the input packet according to the context corresponding to the CID set.

After processing the input packet, the processor 1404 obtains a context processing result. In another example, referring to FIG. 2, the interface 1402 of the forwarder 14 may further include a sender 14024. The sender 14024 is configured to send the context processing result obtained after the processor 1404 processes the input packet to the controller 12.

After receiving the context processing result sent by the sender 14024, the controller 12 may determine according to the context processing result whether to need to continue to process the input packet, and if yes, send a newly determined flow and a newly determined CID set determined for the input packet to the forwarder 14. The receiver 14022 in the forwarder 14 may be further configured to receive a newly determined flow and a newly determined context identifier set determined by the controller 12 for the input packet, so as to instruct the processor 1404 to further process the input packet according to a context corresponding to the newly determined context identifier set.

In a normal case, before receiving the input packet, the memory 1406 already saves CID sets corresponding to most flows. However, a case in which a CID set corresponding to a flow of the input packet cannot be found in the first correspondence stored in the memory 1406 also occurs occasionally, and in this case, the forwarder 14 may obtain the CID set corresponding to the flow of the input packet from the controller 12. In another example of the present invention, after the processor 1404 determines the flow to which the input packet belongs, the processor 1404 may be further configured to: determine whether the first correspondence has a CID set corresponding to the flow to which the input packet belongs, and if yes, the processor 1404 determines the CID set corresponding to the flow to which the input packet belongs according to the first correspondence; or if not, the processor 1404 notifies the sender 14024 to send a flow rule request message to the controller 12, where the flow rule request message includes a packet header or content of the input packet.

The receiver 14022 is further configured to receive a flow rule installation message sent by the controller 12, where the flow rule installation message includes the CID set corresponding to the flow of the input packet. Then, the processor 1404 may determine a context corresponding to the CID set according to the second correspondence stored in the memory 1406, and process the input packet according to the context corresponding to the CID set.

Optionally, the processor 1404 may further add information about the flow to which the input packet belongs, and the CID set corresponding to the flow of the input packet to the first correspondence.

In the conventional technology, whenever the forwarder requests an Action corresponding to the flow of the input packet from the controller, the controller carries the Action into the flow rule installation message and sends the flow rule installation message to the controller. The Action includes many processing parameters, and therefore in order to satisfy requirements for transmitting various Actions, the flow rule installation message needs to be designed to be comparatively long, but if the flow rule installation message is designed to be excessively long, transmission time is prolonged, and packet processing efficiency is affected. This problem may be just solved by using the example provided in the present invention. When the controller receives the flow rule request message from the forwarder, the controller only needs to send the CID set corresponding to the flow of the input packet to the forwarder by using the flow rule installation message, and if the forwarder already stores the context corresponding to the CID set, the forwarder only needs to find a corresponding context according to each CID in the CID set. Space occupied by a CID set is very small, and a flow rule installation message for transmitting the CID set does not need to be designed to be excessively long, and therefore time used for transmitting the flow rule installation message also becomes shorter, and efficiency of processing a packet by the forwarder can also be improved to an extent.

Certainly, besides the method described in the foregoing example, the controller 12 may further send the context corresponding to the CID set and the CID set to the forwarder 14 together. For example, the flow rule installation message sent by the controller 12 may further include the context corresponding to the CID set. In this case, a format of the flow rule installation message may be as follows:

<flow rule installation message>: ={information about a flow, CID1, CID2, CID3>, [CID1, Context1], [CID2, Context2], [CID3, Context3] }

After the receiver 14022 receives the flow rule installation message, if the processor 1404 finds that the second correspondence does not save some or all CIDs in the CID set, and contexts corresponding to the some or all CIDs, the processor 1404 adds the some or all CIDs, and the contexts corresponding to the some or all CIDs to the second correspondence.

Likewise, in a normal case, before the input packet is received, most CIDs and contexts corresponding to the CIDs are already stored in the second correspondence that is stored in the memory 1406. However, a case in which contexts corresponding to one or several CIDs cannot be found in the second correspondence stored in the memory 1406 also occurs occasionally, and in this case, the forwarder 14 may obtain and input the contexts corresponding to the one or several CIDs from the controller 12. For example, in another example, before determining the context corresponding to the CID set according to the second correspondence stored in the memory 1406, the processor 1404 may further determine whether the second correspondence has the context corresponding to the CID set corresponding to the flow to which the input packet belongs; and if yes, determine the context corresponding to the CID set according to the second correspondence stored in the memory 1406; or if some or all CIDs in the CID set have no corresponding context, notify the sender 14024 to send a context request message to the controller 12, where the context request message includes some or all CIDs in the CID set corresponding to the flow to which the input packet belongs.

The receiver 14022 is further configured to receive a context installation message sent by the controller 12, where the context installation message includes some or all CIDs in the CID set, and contexts corresponding to the some or all CIDs in the CID set.

Optionally, the processor 1404 may be further configured to add some or all CIDs in the CID set, and contexts corresponding to the some or all CIDs to the second correspondence.

The forwarder obtains various processing results after processing a packet, and the forwarder needs to report some processing results to the controller, for example, related information obtained by means of lawful interception, a result obtained after an NAT service is performed, and the like. The forwarder may need to further process some results. For example, in another example of the present invention, a processing result obtained after the processor 1404 in the forwarder 14 processes the input packet may be a newly generated packet. Processing performed by the forwarder 14 on the newly generated packet is similar to the processing performed on the input packet, which is not described in detail again herein.

In the conventional technology, an action of OpenFlow merely stipulates which type of processing is performed on a current packet, and the forwarder does not maintain a processing result of the packet, and therefore, when next processing needs to be performed based on a previous processing result for the packet, the action in the conventional technology cannot be implemented.

The first correspondence described in the foregoing example may be stored in the memory 1406 by a technician when performing initial setting on the forwarder 14, may also be sent by the controller 12 to the forwarder 14 after the forwarder 14 and the controller 12 establish a connection. For example, before receiving the input packet, the receiver 14022 may first receive the flow rule installation message sent by the controller 12, where the flow rule installation message includes information about some or all flows supported by the forwarder 14, and a CID set corresponding to the some or all flows supported by the forwarder 14. The receiver 14022 notifies the memory 1406 to save the information about the some or all flows supported by the forwarder 14, and the CID set corresponding to the some or all flows supported by the forwarder 14 in a one-to-one correspondence manner, so as to form the first correspondence.

Likewise, the second correspondence described in the foregoing example may be stored in the memory 1406 by a technician when performing initial setting on the forwarder 14, may also be sent by the controller 12 to the forwarder 14 after the forwarder 14 and the controller 12 establish a connection. For example, before receiving the input packet, the receiver 14022 may first receive the context installation message sent by the controller 12, where the context installation message includes some or all CIDs supported by the forwarder 14, and contexts corresponding to the some or all CIDs supported by the forwarder 14. The receiver 14022 notifies the memory 1406 to save the some or all CIDs supported by the forwarder 14, and the contexts corresponding to the some or all CIDs supported by the forwarder 14 in a one-to-one correspondence manner, so as to form the second correspondence.

In another example, before the forwarder 14 communicates with the controller 12, the forwarder 14 may first negotiate with the controller 12, so as to learn a capability of a peer for processing flows and contexts. For example, the sender 14024 in the forwarder 14 sends a capability negotiation request message to the controller 12, where the capability negotiation request message includes a context capability list supported by the forwarder, so that the controller 12 sends some or all contexts that the forwarder 14 can support to the forwarder 14; the receiver 14022 receives a negotiation response message sent by the controller 12, where the negotiation response message may include a context capability list supported by the controller 12, so that the forwarder 14 requests, according to the context capability list supported by the controller 12, some or all contexts that the controller can support from the controller.

The foregoing negotiation between the forwarder 14 and the controller 12 may also be actively initiated by the controller 12. For example, the receiver 14022 in the forwarder 14 receives a capability negotiation request message sent by the controller 12, where the capability negotiation request message includes a context capability list supported by the controller 12, so that the forwarder 14 requests, according to the context capability list supported by the controller 12, some or all contexts that the controller can support from the controller 12; the sender 14024 in the forwarder 14 sends a negotiation response message to the controller 12, where the negotiation response message may include a context capability list supported by the forwarder 14, so that the controller 12 sends some or all contexts that the forwarder 14 can support to the forwarder 14.

The controller 12 may manage the first correspondence or the second correspondence stored in the memory 1406 of the forwarder 14, such as, query, change or delete information in the first correspondence or the second correspondence.

For example, if the controller 12 needs to query a CID set corresponding to a flow, the controller 12 sends a flow rule query request message to the forwarder 14, and the receiver 14022 in the forwarder 14 receives the flow rule query request message sent by the controller 12, where the query request message includes information about a to-be-queried flow; the processor 1406 finds a CID set corresponding to the to-be-queried flow according to the first correspondence, and notifies the sender 14024 to send a flow rule query response message to the controller 12, where the flow rule query response message includes the information about the to-be-queried flow, and the CID set corresponding to the to-be-queried flow.

For another example, if the controller 12 needs to query contexts corresponding to one or several CIDs, the controller 12 sends a context query request message to the forwarder 14, and the receiver 14022 in the forwarder 14 receives the context query request message sent by the controller 12, where the query request message includes a to-be-queried CID, and there may be one or more to-be-queried CIDs; the processor 1404 finds a context corresponding to the to-be-queried CID according to the second correspondence, and notifies the sender 14024 to send a context query response message to the controller, where the query response message includes the context corresponding to the to-be-queried CID. Optionally, the foregoing query response message may further include the to-be-queried CID.

For another example, if the controller 12 needs to change a CID set corresponding to a flow, the controller 12 sends a flow change message to the forwarder 14, and the receiver 14022 in the forwarder 14 receives the flow rule change message sent by the controller 12, where the flow change message includes information about a to-be-changed flow, and a new CID set corresponding to the to-be-changed flow; the receiver 14022 notifies the processor 1404 to change the CID set corresponding to the to-be-changed flow into the new CID set in the first correspondence. For example, the receiver 14022 receives the flow rule change message sent by the controller 12, where the information about the to-be-changed flow included in the flow rule change message is that: for a flow whose source IP address is 10.88.85.55, and whose destination IP address is 10.88.80.56, new CID sets corresponding to the to-be-changed flow are CID1, CID2, and CID5. If in the first correspondence, CID sets originally corresponding to a flow whose source IP address is 10.88.85.55, and whose destination IP address is 10.88.80.56 are: CID1, CID2, and CID3, after receiving the foregoing flow change message, the receiver 14022 notifies the processor 1404 to change the CID sets corresponding to the flow whose source IP address is 10.88.85.55, and whose destination IP address is 10.88.80.56 into CID1, CID2, and CID5.

For another example, if the controller 12 needs to change contexts corresponding to one or several CID5, the controller 12 sends a context change message to the forwarder 14, and the receiver 14022 of the forwarder 14 receives the context change message sent by the controller 12, where the context change message includes a to-be-changed CID, and a new context corresponding to the to-be-changed context identifier; the receiver 14022 notifies the processor 1404 to change the context corresponding to the to-be-changed CID into the new context in the second correspondence. For example, a context originally corresponding to CID1 is Context1a, and if the context change message received by the receiver 14022 includes CID1, and a new context Context1b corresponding to CID1, the receiver 14022 notifies the processor 1404 to change the context corresponding to CID1 into Context1b in the second correspondence.

For another example, if the controller 12 needs to delete information about a flow, the controller 12 sends a flow deletion message to the forwarder 14, and the receiver 14022 in the forwarder 14 receives the flow deletion message sent by the controller 12, where the flow deletion message includes the information about the to-be-deleted flow; the receiver 14022 notifies the processor 1404 to delete the information about the to-be-deleted flow, and a CID set corresponding to the to-be-deleted flow from the first correspondence.

Optionally, if some or all CIDs corresponding to the deleted flow are not corresponding to other flows, the processor 1404 may further delete the some or all CIDs corresponding to the deleted flow, and contexts corresponding to the some or all CIDs corresponding to the deleted flow from the second correspondence.

For example, it is assumed that CID sets corresponding to a flow 1 include CID1, and CID2; CID sets corresponding to a flow 2 include CID1, and CID3. After the processor 1404 deletes information about the flow 1 from the first correspondence, if the processor 1404 finds that CID2 is only corresponding to the flow 1, the processor 1404 may further delete a context corresponding to CID2 from the second correspondence. However, CID1 is not only corresponding to the flow 1, but also corresponding to the flow 2, and therefore the processor 1404 does not delete the context corresponding to CID1.

If after the information about the flow 2 is also deleted, the processor 1404 finds that CID1 is not corresponding to other flows, the processor 1404 deletes the context corresponding to CID1 from the second correspondence.

Optionally, the processor 1404 may further notify the sender 14024 to report information about a deleted flow or a CID corresponding to a deleted context to the controller 12.

For another example, if the controller 12 needs to delete a context, the controller 12 sends a context deletion message to the forwarder 14, and the receiver 14022 in the forwarder 14 is configured to receive the context deletion message sent by the controller 12, where the context deletion message includes at least one to-be-deleted context identifier; the receiver 14022 is configured to instruct the processor 1404 to delete the at least one to-be-deleted CID, and a context corresponding to the at least one to-be-deleted CID from the second correspondence.

Optionally, after deleting a context in the second correspondence, the processor 1404 may further correspondingly change the first correspondence, for example, the processor 1404 deletes a CID corresponding to the deleted context in the first correspondence.

Context deletion may cause occurrence of a problem when the processor 1404 processes the flow corresponding to the CID of the context, and therefore, after deleting the CID corresponding to the deleted context in the first correspondence, the processor 1404 may further delete information about the flow corresponding to the deleted CID in the first correspondence.

For example, it is assumed that CID sets corresponding to a flow 1 include CID1, and CID2; CID sets corresponding to a flow 2 include CID1, and CID3. After the processor 1404 deletes CID1 corresponding to the context from the second correspondence stored in the memory 1406, if the processor 1404 finds that flows corresponding to CID1 include the flow 1 and the flow 2, the processor 1404 may further delete information about the flow 1 and information about the flow 2 in the first correspondence. Moreover, the processor 1404 may further delete CID sets separately corresponding to the flow 1 and the flow 2.

Optionally, the processor 1404 may further notify the sender 14024 to report a CID corresponding to a deleted context or information about a deleted flow to the controller 12.

By using the foregoing example provided in the present invention, the controller 12 may effectively manage the first correspondence and the second correspondence saved in the forwarder 14.

After the forwarder provided in this embodiment of the present invention is introduced, a method according to an embodiment of the present invention is introduced below by using some examples.

Figure 3:
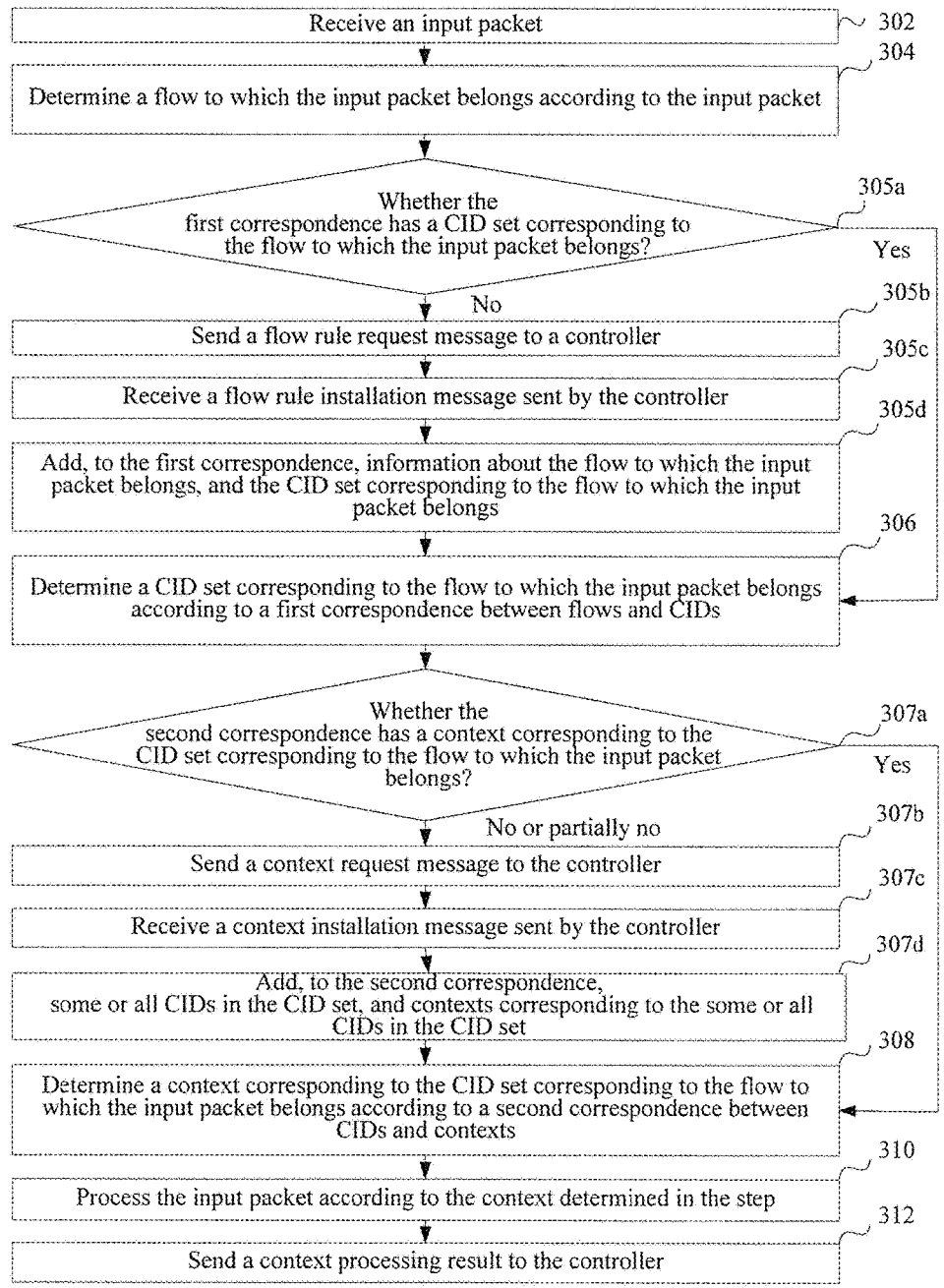
FIG. 3 is a schematic flowchart of a method for processing a packet by a forwarder according to an embodiment of the present invention.

FIG. 3 is a schematic flowchart of a method for processing a packet by a forwarder according to an embodiment of the present invention, which is specifically as follows:

Step 302: A forwarder receives an input packet.

The input packet may be sent by another forwarder, and may also be sent by another entity (such as, a computer, a mobile terminal, or a fixed terminal).

Step 304: The forwarder determines a flow to which the input packet belongs according to the input packet.

The forwarder may determine the flow to which the input packet belongs according to a packet header or content of the input packet. There may be one or more flows to which the input packet belongs.

For example, after the forwarder receives the input packet, a packet header of the input packet is as follows:

MAC1|MAC2|IP-TYPE (0x0800)|IP1|IP2|TCP-TYPE (6)|PORT1|PORT2, where MAC1 is a MAC source address of a packet; MAC2 is a MAC destination address of the packet; IP-TYPE (0X800) denotes that a network layer protocol of the packet is the IPv4 protocol, IP1 is an IP source address of the packet; IP2 is an IP destination address of the packet; TCP-TYPE(6) denotes that a transfer layer protocol of the packet is the TCP protocol, PORT1 is a source TCP port number of the packet, and PORT2 is a destination TCP port number of the packet.

A flow to which the input packet belongs may be determined by using some or all content of the packet header of the input packet. By using the foregoing packet header as an example, it may be determined according to the foregoing packet header that the input packet belongs to a flow whose MAC source address is MAC1, and whose MAC destination address is MAC2, the input packet belongs to a flow whose IP source address is IP1, and whose IP source address is IP2, or the like.

Step 306: The forwarder determines a CID set corresponding to the flow to which the input packet belongs according to a first correspondence between flows and CIDs, where a CID set corresponding to each flow in the first correspondence includes at least one CID.

It is assumed that the forwarder has only one flow table, the flow table includes flow table entries shown in Table 5, a first column of Table 5 denotes a flow match field, and a second column denotes a CID set matching the flow match field.

TABLE 5

| Src-MAC = MAC1, dst-MAC = MAC2 | CID set 1 |

The forwarder matches the packet header of the input packet and the flow match field in the table 5, and finds that a CID set corresponding to the flow to which the input packet belongs (a flow whose MAC source address is MAC1, and whose MAC destination address is MAC2) is a CID set 1.

When the packet header of the input packet can match multiple flow table entries in the flow table, the forwarder selects a flow table entry with the highest priority as a flow table entry matching the input packet according to priorities of the flow table entries.

Step 308: The forwarder determines a context corresponding to the CID set corresponding to the flow to which the input packet belongs according to a second correspondence between CIDs and contexts.

For example, it is assumed that the foregoing CID set 1 only includes a CID, such as CID=5. The second correspondence between CIDs and contexts that is saved in the forwarder is shown in Table 6 as follows:

TABLE 6

| CID | context |
| --- | --- |
| 1 | (MBR: 2 Mbps, outport: 1) |
| 2 | (tunnel_id: 12345, outport: 2) |
| 3 | (DPI, outport: 2) |
| 4 | (DPI, outport: 1) |
| 5 | (outport: 1) |
| 6 | (IPv4 Defragment) |
| 7 | (BFD, Interval: 5) |
| 8 | (LLDP) |
| ... | ... |

According to the foregoing description, a CID set corresponding to a first flow to which the input packet belongs is the CID set 1, and if the CID set 1 only has a CID whose serial number is 5, the forwarder may find that a context corresponding to the CID is: outport:1 according to the CID whose serial number is 5.

Step 310: The forwarder processes the input packet according to the context determined in step 308.

For example, if the Context corresponding to the CID whose serial number is 5 is: outport:1, the forwarder forwards the input packet to a port 1.

By using the method described in the foregoing embodiment, the forwarder may store more contexts, and may support more types for packet processing, thereby improving a capability of the forwarder for processing a packet.

The method described in the foregoing embodiment is further applicable to a case in which there are multiple flows to which the input packet belongs, for example, when the forwarder determines that there are two flows to which the input packet belongs in step 304, after performing step 310, the forwarder may further shift to step 306, and determine a CID set corresponding to another flow to which the input packet belongs according to another flow table. For example, it is assumed that another flow table in the forwarder includes flow table entries shown in Table 7, a first column of Table 7 denotes a flow match field, and a second column denotes a CID set matching the flow match field.

TABLE 7

| Src-IP = IP1, dst-IP = IP2 | CID set 2 |

The forwarder matches the header of the input packet and the flow match field in the table 7 in the forwarder, and finds that a CID set corresponding to another flow to which the input packet belongs (a flow whose IP source address is IP1, and whose IP destination address is IP2) is a CID set 2. Then, the forwarder may process the input packet according to a CID corresponding to the CID set 2.

If the CID set corresponding to the flow to which the input packet belongs includes multiple CIDs, the forwarder processes the input packet according to contexts corresponding to the multiple CIDs in a preset context sequence.

If the foregoing context sequence includes a case in which at least two contexts are the same in sequence, the forwarder processes the input packet according to both of the at least two contexts.

A sequence in which contexts are performed may be denoted in the following three manners.

(1) In the first correspondence, a sequence number is set for each CID in a CID set corresponding to each flow. For example, the CID set corresponding to the flow to which the input packet belongs is CID1-CID5, and sequence numbers corresponding to CID1-CID5 are separately shown in a second column of Table 8. The forwarder processes the input packet according to contexts corresponding to CID1-CID5 in a sequence of the second column, and because CID3 and CID4 have a same sequence number, the forwarder processes the input packet according to contexts corresponding to both CID3 and CID4.

TABLE 8

| CID1 | 1 |
| CID2 | 2 |
| CID3 | 3 |
| CID4 | 3 |
| CID5 | 4 |

(2) In the first correspondence, each CID in a CID set corresponding to each flow has a default arrangement sequence, and there may be an association between some CIDs and other CIDs. For example, the CID set corresponding to the flow to which the input packet belongs is shown in Table 9, a first column denotes an arrangement sequence of CIDs, and a second column denotes an association between each CID and other CIDs. When processing the input packet according to CID1-CID5, the forwarder performs processing in the arrangement sequence of the CIDs in the first column of Table 9 for a CID not associated with other CIDs. Because the second column indicates that CID3 and CID4 are associated, the forwarder processes the input packet according to the contexts corresponding to both CID3 and CID4.

TABLE 9

| CID1 | |
| CID2 | |
| CID3 | CID4 |
| CID4 | CID3 |
| CID5 | |

(3) In the first correspondence, a sequence of performing a CID set corresponding to each flow and each CID in the CID set may be denoted by using two lists. For example, the CID set corresponding to the flow to which the input packet belongs is shown in Table 10, Table 10 is used to indicate a default arrangement sequence of CIDs from the top downward, and Table 11 is used to indicate an association between CIDs. For CIDs in Table 11 that are recorded to have an association, the forwarder processes the input packet according to contexts corresponding to these CIDs at the same time. For CIDs in Table 11 that are not recorded to have an association, the forwarder processes the input packet in a default arrangement sequence of CIDs shown in Table 10.

TABLE 10

| CID1 |
| CID2 |
| CID3 |
| CID4 |
| CID5 |

TABLE 11

| CID2, CID3, CID4 |

In the conventional technology, the forwarder can only perform execution sequentially in an arrangement sequence of Actions corresponding to the flow of the input packet. However, in this embodiment of the present invention, an association between sequence numbers of CIDs or CIDs is introduced, so that contexts corresponding to some CIDs may be processed in parallel, thereby improving the efficiency of the forwarder for processing a packet.

However, in an actual application, not all context types may be processed in parallel, and only in a case in which processing results of two or several contexts do not affect each other, these two or several contexts can be processed in parallel. For example, such two context types as firewall processing and forwarding cannot be processed in parallel; because processing results of these two contexts affect each other, the forwarder needs to first perform firewall processing on input data, and then perform forwarding; or first forward the input packet, and then perform firewall processing. However, lawful interception and forwarding may be processed in parallel. There are many examples in which processing may be performed in parallel, which are not enumerated one by one herein.

In step 310, after processing the input packet, the forwarder obtains a context processing result. Optionally, in another example, the forwarder may further perform the following step:

Step 312: The forwarder sends the context processing result to the controller.

The forwarder sends the context processing result to the controller by using an event reporting message. There may be many context processing results, such as, whether packet forwarding is successful, a charging result obtained after online charging is performed on the input packet, a result obtained after DPI is performed on the input packet, and the like.

For example, if context processing performed by the forwarder on the input packet in step 310 is DPI performed on the input packet, in step 312, the forwarder may send a result obtained after DPI is performed on the input packet to the controller by using an event reporting message, where the event reporting message includes an event needing to be reported (such as, a P2P packet is detected (P2P_DTECTED)). In addition, the event reporting message may further include some or all content of the input packet, and/or a result of performing a context (such as, detailed information obtained after DPI is performed on the input packet).

After receiving the event reporting message, the controller may determine according to the context processing result whether to need to continue to process the input packet, and if yes, send a newly determined flow and a newly determined CID set determined for the input packet to the forwarder, so that the forwarder processes the input packet according to the newly determined flow and the newly determined CID set. For example, if after receiving the event reporting message, the controller finds that the context processing result included in the event reporting message is "the input packet is forwarded successfully", the controller may not perform any processing. For another example, after the forwarder sends an event needing to be reported and some or all content of the input packet to the controller by using the event reporting message, if the controller finds that the controller needs to continue to process the input packet, the controller sends a new flow table entry to the forwarder, so that the forwarder processes the input packet according to the new flow table entry, where the new flow table entry includes a newly determined flow match field and a newly determined CID set determined for the input packet.

In a general situation, before receiving the input packet, the forwarder already saves a CID set corresponding to the flow to which the packet belongs. However, a case in which the forwarder cannot find a CID set corresponding to a flow of the input packet in the first correspondence also occurs occasionally, and in this case, the forwarder may obtain the CID set corresponding to the flow of the input packet from the controller. Referring to FIG. 3, in another example of the present invention, before the forwarder performs step 306, the method may further include:

Step 305*a*: Determine whether the first correspondence has a CID set corresponding to the flow to which the input packet belongs; and if yes, perform step 306 to step 310; or if not, perform step 305*b* to step 305*d*.

Step 305*b*: Buffer the input packet into a buffer, and send a flow rule request message to the controller, where the flow rule request message includes a packet header of the input packet or some or all content of the input packet.

For example, when the forwarder communicates with the controller by using the OpenFlow protocol, the forwarder sends a packet reporting (Packet_In) message to the controller to request to obtain a CID set corresponding to the input packet, where the Packet_In message includes the packet header of the input packet or the some or all content of the input packet. In addition, the Packet_In message may further carry information about the buffer into which the input packet is buffered (such as, Buffer_ID), a reporting reason (such as, a reason is that "a flow table has no matching flow table entry"), and the like.

Step 305*c*: Receive a flow rule installation message sent by the controller, where the flow rule installation message includes the CID set corresponding to the flow of the input packet.

For example, after receiving the flow rule request message sent by the forwarder, the controller determines according to the packet header or content of the input packet in the flow rule request message that the CID set corresponding to the flow to which the input packet belongs includes seven CIDs, which are specifically as follows:

CID1 control at a maximum bandwidth of 2 Mbps
CID2 packet reassembly
CID3 DPI
CID4 virus firewall detection
CID5 packet buffering
CID6 lawful interception
CID7 forwarding to a port 1

The controller sends the CID set corresponding to the flow to which the input packet belongs to the forwarder by using the flow rule installation message, for example, the controller may send the CID set corresponding to the flow to which the input packet belongs to the forwarder by using a flow rule installation message, where a format of the flow rule installation message is as follows:

<flow rule installation message>:={information about a flow, <CID1, CID2, CID3, CID4, CID5, CID6, CID7>}

Optionally, the controller may also send the CID set corresponding to the flow to which the input packet belongs to the forwarder by using multiple flow rule installation messages, such as:

<flow rule installation message 1>: ={information about a flow, <CID1, CID2, CID3, CID4>}
<flow rule installation message 2>: ={information about a flow, <CID5, CID6, CID7>}

Optionally, the flow rule installation message sent by the controller may further include a sequence of performing each CID, such as:

<flow rule installation message>:={information about a flow, <(CID1, 1), (CID2, 2), (CID3, 3), (CID4, 4), (CID5, 4), (CID6, 4), (CID7, 5)>}

It may be seen by using the foregoing sequence of performing each CID that, CID4, CID5 and CID6 need to be performed at the same time. The foregoing format of the flow rule installation message is only an example, and may be another format in an actual application, for example, the CID set corresponding to the flow to which the input packet belongs is denoted by using a CID list (list), as long as the CID set corresponding to the flow of the input packet can be sent to the forwarder.

For another example, after receiving the flow rule request message sent by the forwarder, the controller determines according to the packet header or content of the input packet in the flow rule request message that the flow to which the input packet belongs is a flow corresponding to the BFD/LLDP protocol, and the controller determines a CID set corresponding to the flow corresponding to the BFD/LLDP protocol. The corresponding CID set may only include a CID as follows:

CID8 BFD/LLDP protocol processing

The controller sends the CID set corresponding to the flow to which the input packet belongs to the forwarder by using a flow rule installation message. For example, a format of the flow rule installation message is as follows:

<flow rule installation message>:={information about a flow, <CID8>}

After receiving the foregoing flow rule installation message, the controller only performs BFD/LLDP protocol processing on the input packet, such as updates a protocol state machine. When there are multiple flows to which the input packet belongs, the controller may send CID sets corresponding to the flows to the forwarder by using multiple flow rule installation messages, so that the forwarder saves the CID sets corresponding to the flows into different flow tables.

For example, when the forwarder communicates with the controller by using the OpenFlow protocol, the foregoing flow rule installation message may be a Flow_Mod message, and information about the foregoing flow may be a flow match field (Flow match field). It is assumed that the input packet is corresponding to two flows, and flow match fields corresponding to the flows are separately Flow match field1 and Flowmatch field2. The controller carries Flowmatch field1, and CID list1 corresponding to Flow match field1 into a first Flow_Mod message sent to the forwarder; and carries Flow match field2, and CID list2 corresponding to Flow match field2 into a second Flow_Mod message sent to the forwarder. The controller may further carry information about a flow table (such as, an ID of a flow table (table id)) into each Flow_Mod message, so that the forwarder adds a Flow match field and a CID set corresponding to the Flow match field carried in each Flow_Mod message to a corresponding flow table. For example, the first Flow_Mod message includes table id=1, and the second Flow_Mod message includes table id=2). Moreover, a Flow_Mod message may further carry information used to indicate a flow table processing sequence. For example, the first Flow_Mod message includes a piece of indication information (such as "Goto-table 2"). After receiving the first Flow_Mod message, the forwarder finds corresponding CID list1 according to Flow match field1 in table1, and processes the input packet according to a context corresponding to CID list1, and then, the forwarder further needs to perform matching on the input packet according to table2 to find corresponding CID list2, and processes the input packet according to a context corresponding to CID list2.

Step 305*d*: Add information about the flow to which the input packet belongs, and the CID set corresponding to the flow to which the input packet belongs to the first correspondence.

Step 305*d* is optional, and step 305*d* may be performed after step 305*c*, and may also be performed after step 306.

In the conventional technology, whenever the forwarder requests an Action corresponding to the flow to which the input packet belongs from the controller, the controller carries the Action into the flow rule installation message and sends the flow rule installation message to the controller. The Action includes many processing parameters, and therefore in order to satisfy requirements for transmitting various Actions, the flow rule installation message needs to be designed to be comparatively long, but if the flow rule installation message is designed to be excessively long, transmission time is prolonged, and packet processing efficiency is affected. This problem may be just solved by using the example provided in the present invention. When the controller receives the flow rule request message from the forwarder, the controller only needs to send the CID set corresponding to the flow of the input packet to the forwarder by using the flow rule installation message, and if the forwarder already stores the context corresponding to the CID set, the forwarder only needs to find a corresponding context according to each CID in the CID set. Space occupied by a CID set is very small, and a flow rule installation message for transmitting the CID set does not need to be designed to be excessively long, and therefore time used for transmitting the flow rule installation message also becomes shorter, and efficiency of processing a packet by the forwarder can also be improved to an extent.

Certainly, besides the method described in the foregoing example, the controller may further send the context corresponding to the CID set and the CID set to the forwarder together. For example, the flow rule installation message sent by the controller in step 305*c* may further include the context corresponding to the CID set. In this case, a format of the flow rule installation message may be as follows:

<flow rule installation message>:={information about a flow, <CID1,CID2,CID3>,[CID1,Context1],[CID2,Context2],[CID3,Context3] }

After receiving the flow rule installation message, if the forwarder finds that the second correspondence does not save some or all CIDs in the CID set, and contexts corresponding to the some or all CIDs, the forwarder adds the some or all CIDs, and the contexts corresponding to the some or all CIDs to the second correspondence.

In a general situation, before the input packet is received, most CIDs and contexts corresponding to the CIDs are already stored in the second correspondence in the forwarder. However, a case in which the forwarder cannot find contexts corresponding to one or several CIDs in the second correspondence may also occur, and in this case, the forwarder may obtain the contexts corresponding to the one or several CIDs from the controller. Referring to FIG. 3, in another example, before performing step 308, the forwarder may further perform the following steps:

Step 307*a*: Determine whether the second correspondence has a context corresponding to the CID set corresponding to the flow to which the input packet belongs; and if yes, perform step 308; or if the second correspondence does not have some or all CIDs in the CID set, perform step 307*b* to step 307*d*.

Step 307*b*: Send a context request message to the controller, where the context request message includes the some or all CIDs in the CID set.

Step 307*c*: Receive a context installation message sent by the controller, where the context installation message includes some or all CIDs in the CID set, and contexts corresponding to the some or all CIDs in the CID set.

Optionally, the context installation message may further include other CIDs except the CID set and contexts corresponding to the other CIDs.

Step 307*d*: Add each CID in the context installation message, and a context corresponding to each CID in the context installation message to the second correspondence.

Step 307*d* is optional, and step 307*d* may be performed after step 307*c*, and may also be performed after step 308.

Figure 4:
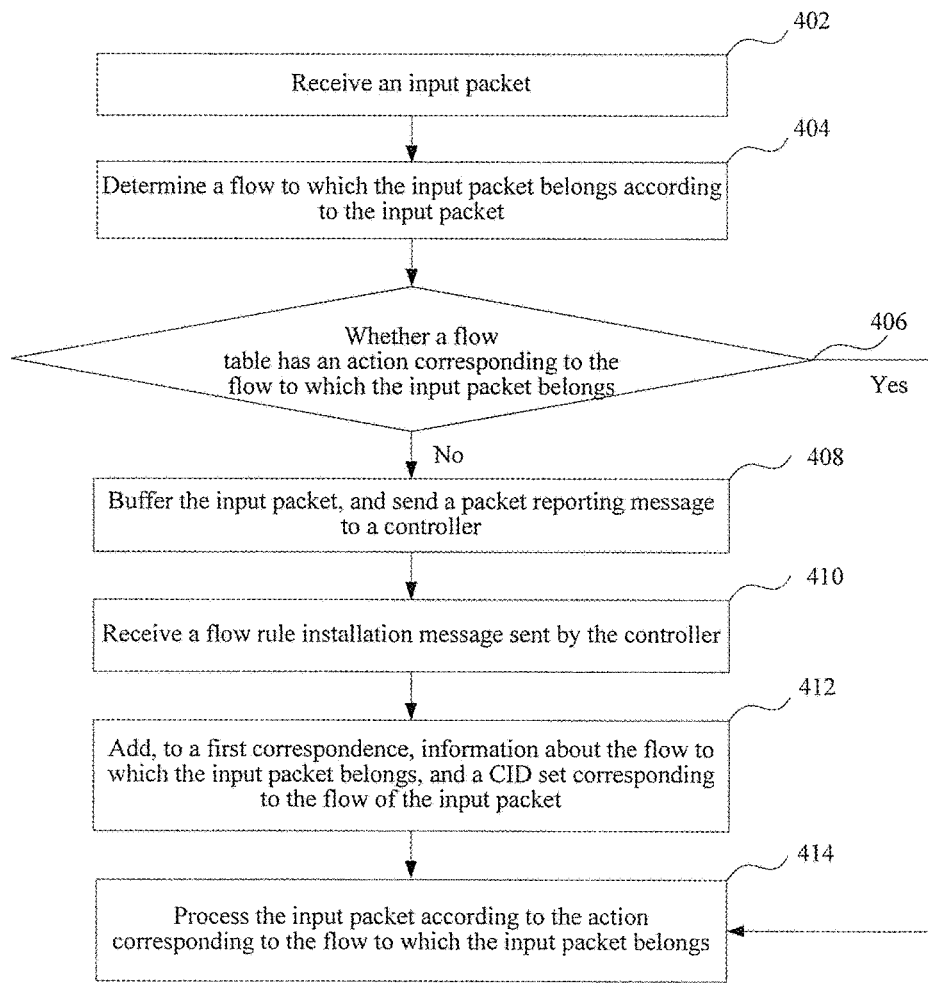
FIG. 4 is a schematic flowchart of a method for processing an input packet by an OpenFlow forwarder according to an embodiment of the present invention.

In order to be compatible with the OpenFlow protocol in the conventional technology, an embodiment of the present invention further provides another implementation solution, and in the solution, a forwarder may process an existing Action in the conventional technology according to a process in the conventional technology. Besides the existing Action in the conventional technology, an Action (such as, Handle_Context) used to instruct the forwarder to perform context processing on a flow to which a packet belongs is further newly defined in this embodiment. Referring to FIG. 4, a method of an embodiment of the present invention is as follows:

Step 402: An OpenFlow Switch receives an input packet.

Step 404: The OpenFlow Switch determines a flow to which the packet belongs according to the packet.

Step 406: The OpenFlow Switch determines whether a flow table has an action corresponding to the flow to which the input packet belongs, and if yes, perform the corresponding action; or if not, perform step 408.

Step 408: Buffer the input packet into a buffer, and send a Packet_In message to an OpenFlow controller to request to obtain an action corresponding to the input packet.

The foregoing Packet_In message carries some or all content of the input packet. In addition, the Packet_In message may further carry information about the buffer into which the input packet is buffered (such as, Buffer_ID), a reporting reason (such as, a reason is that "a flow table has no matching flow table entry"), and the like.

Step 410: The OpenFlow Controller determines the action corresponding to the input packet and a CID set corresponding to the flow to which the input packet belongs according to information in the Packet_In message, and sends the action corresponding to the flow of the input packet and the CID set corresponding to the flow to which the input packet belongs to the OpenFlow Switch by using a flow rule installation (such as, Flow_Mod) message. The action corresponding to the input packet may be a standard action defined in the OpenFlow protocol, and may also be newly added action used to instruct the forwarder to perform context processing on the flow to which the packet belongs, such as a Handle_Context action. When the action corresponding to the input packet is a standard action defined in the OpenFlow protocol, the Packet_In message only needs to carry a parameter corresponding to the standard action, which does not include a CID set. When the action corresponding to the flow to which the input packet belongs includes an action used to instruct the forwarder to perform context processing on the flow to which the packet belongs, the CID set corresponding to the flow to which the input packet belongs needs to be carried in the flow rule installation message as a parameter of the action. By using this solution, an existing Openflow action and context processing may coexist in a manner of being compatible with an existing action of the Openflow protocol.

For example, the foregoing Flow_Mod message may include a Flow match field corresponding to the flow to which the input packet belongs, and an action list corresponding to the flow match information, which includes one or more actions (such as Set-field, and Output). If the input packet needs to be processed according to some contexts, the action corresponding to the flow match field may further include the Handle_Context action, and the parameter of the Handle_Context action is the CID set corresponding to the flow to which the input packet belongs. An implementation format thereof is as follows:

Flow_Mod:={match field, Instructions(action list)}

When there are multiple flows to which the input packet belongs, the OpenFlow Controller may send Flow entries corresponding to the flows to the OpenFlow Switch by using multiple Flow_Mod messages, so that the OpenFlow Switch saves the Flow entries corresponding to the flows into different flow tables. Each flow entry optionally includes the foregoing Handle_Context action and a parameter (such as, a CID set) of the Handle_Context action.

For example, it is assumed that the input packet is corresponding to two flows, and flow match fields corresponding to the two flows are separately Flow match field1 and Flow match field2. The OpenFlow Controller carries Flow match field1, and an action list corresponding to Flow match field1 into a first Flow_Mod message sent to the OpenFlow Switch; and carries Flow match field2, and an action list corresponding to Flow match field2 into a second Flow_Mod message sent to the OpenFlow Switch. Besides action types and parameters thereof defined in OpenFlow, the action lists of the foregoing two messages optionally include a type of a Handle_Context action and a parameter (such as, a CID set) of the Handle_Context action according to context processing requirements.

The OpenFlow Controller may further carry information about a flow table (such as, an ID of a flow table) into each Flow_Mod message, so that the OpenFlow Switch adds information about a flow and a CID set corresponding to the flow carried in each Flow_Mod message to a corresponding flow table. For example, the first Flow_Mod message includes table id=1, and the second Flow_Mod message includes table id=2).

Moreover, a Flow_Mod message may further carry information used to indicate a flow table processing sequence. For example, the first Flow_Mod message includes a piece of indication information (such as "Goto-table 2"). After receiving the first Flow_Mod message, the OpenFlow Switch finds a corresponding action list according to Flow match field1 in table1, and processes the input packet according to an action corresponding to Flow match field1. If it includes the Handle_Context action, the forwarder obtains a CID set (such as, CID list1) corresponding to the flow to which the input packet belongs according to a parameter of the Handle_Context action, finds a context corresponding to CID list1 in a second correspondence according to CID list1, and then processes the input packet according to the context corresponding to CID list1. After the foregoing flow rule processing of table1 is completed, matching further needs to be performed on the input packet according to table2 to find a corresponding action list, and the input packet is processed according to the action list.

Step 412: After receiving the flow rule installation message, the OpenFlow Switch adds information about the flow to which the input packet belongs, and a CID set corresponding to the flow of the input packet to a corresponding first correspondence.

Step 412 is optional, and step 412 may be performed after step 410, and may also be performed after step 414.

Step 414: The OpenFlow Switch takes out a buffered packet from a buffer corresponding to Buffer_ID, and the OpenFlow Switch processes the input packet according to the action corresponding to the flow to which the input packet belongs.

When the action corresponding to the flow to which the input packet belongs is Handle_Context, the processing performed by the forwarder on the input packet is similar to that in step 406 to step 410, which is not described in detail again herein.

In the foregoing implementation based on OpenFlow, the action may be included in an Apply-Actions structure of the Flow_mod message, and may also be included in a Write-Actions structure. Persons skilled in the art may understand that, description is performed above only by using the OpenFlow protocol as an example, and the forwarder may also communicate with the controller by using another protocol.

The forwarder obtains various processing results after processing a packet, and the forwarder needs to report some processing results to the controller, for example, related information obtained by means of lawful interception, a result obtained after an NAT service is performed, and the like. The forwarder may need to further process some results. In another example of the present invention, a processing result obtained after the forwarder processes the input packet may be a newly generated packet.

For example, the processing performed by the forwarder on the input packet is interception performed on the input packet. An intercepted result usually needs to be forwarded to a specific network entity, and therefore the forwarder needs to encapsulate the intercepted result (such as, content of the input packet), thereby obtaining a newly generated packet. After the forwarder obtains the newly generated packet, the processing performed by the forwarder on the newly generated packet is the same as the processing performed on the input packet, that is, processing similar to that in step 302 to step 312 is performed on the newly generated packet.

In the conventional technology, an action of OpenFlow merely stipulates which type of processing is performed on a current packet, and the forwarder does not maintain a processing result of the packet, and therefore, when next processing needs to be performed based on a previous processing result for the packet, the Action in the conventional technology cannot be implemented.

Figure 5:
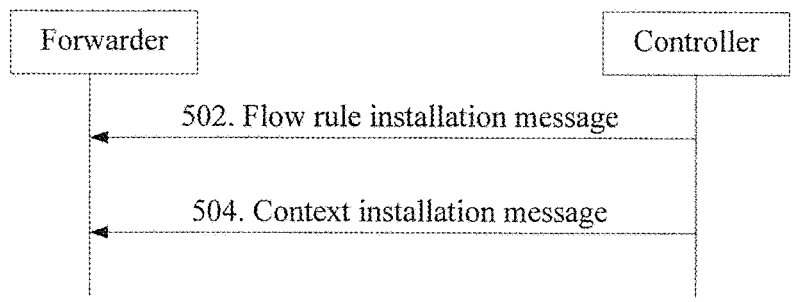
FIG. 5 is a schematic flowchart of a method for installing a flow or context by a forwarder according to an embodiment of the present invention.

The first correspondence described in the foregoing example may be stored in the forwarder by a technician when performing initial setting on the forwarder, may also be sent by the controller to the forwarder after the forwarder and the controller establish a connection. For example, referring to FIG. 5, before receiving the input packet, the forwarder may receive the flow rule installation message shown in step 502 and sent by the controller, where the flow rule installation message includes information about some or all flows supported by the forwarder, and a CID set corresponding to the some or all flows supported by the forwarder.

For example, the controller may send information about a flow supported by the forwarder, and a CID set corresponding to the flow supported by the forwarder to the forwarder by using one or more flow rule installation messages.

The forwarder saves the information about the some or all flows supported by the forwarder, and the CID set corresponding to the some or all flows supported by the forwarder in a one-to-one correspondence manner, so as to form the first correspondence.

The second correspondence described in the foregoing example may be stored in the forwarder by a technician when performing initial setting on the forwarder, may also be sent by the controller to the forwarder after the forwarder and the controller establish a connection. For example, referring to FIG. 5, before receiving the input packet, the forwarder may receive the context installation message shown in step 504 and sent by the controller, where the context installation message includes some or all CIDs supported by the forwarder, and contexts corresponding to the some or all CIDs supported by the forwarder.

When the controller needs to send multiple contexts to the forwarder, the controller may send the multiple contexts to the forwarder by using a context installation message, and may also send the multiple contexts to the forwarder by using multiple context installation messages. Each context installation message may include one or more CIDs and contexts corresponding to the one or more CIDs.

The forwarder saves the some or all CIDs supported by the forwarder, and the contexts corresponding to the some or all CIDs supported by the forwarder in a one-to-one correspondence manner, so as to form the second correspondence.

Figure 6A:
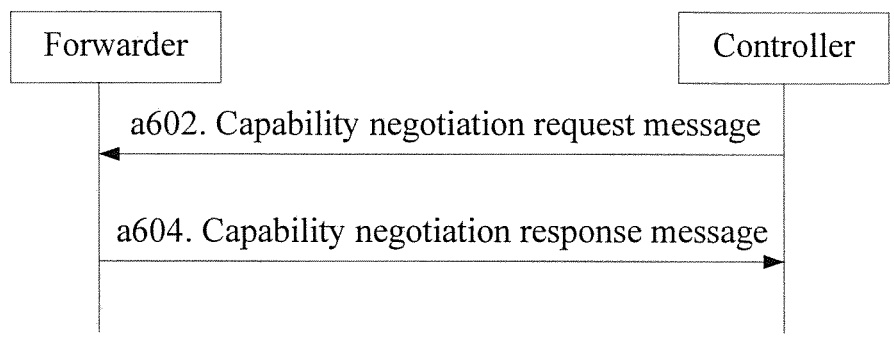
FIG. 6a is a schematic flowchart of a method for performing negotiation between a forwarder and a controller according to an embodiment of the present invention.

In another example, before the forwarder communicates with the controller, the forwarder may first negotiate with the controller, so as to learn a capability of a peer for processing flows and contexts. For example, FIG. 6a shows a case in which a forwarder first initiates negotiation, which specifically includes the following steps:

Step a602: The forwarder sends a capability negotiation request message to a controller, where the capability negotiation request message includes a context capability list supported by the forwarder, so that the controller sends some or all contexts that the forwarder can support to the forwarder.

Optionally, the foregoing controller may actively send some or all contexts that the forwarder can support to the forwarder; and may also send some or all contexts that the forwarder can support to the forwarder after receiving a flow rule request message and a context request message sent by the forwarder.

Step a604: The forwarder receives a negotiation response message sent by the controller, where the negotiation response message may include a context capability list supported by the controller, so that the forwarder requests, according to the context capability list supported by the controller, some or all contexts that the controller can support from the controller.

Figure 6B:
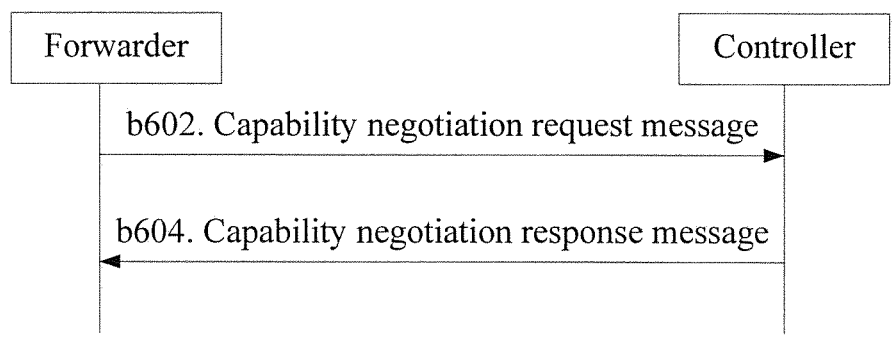
FIG. 6b is a schematic flowchart of another method for performing negotiation between a forwarder and a controller according to an embodiment of the present invention.

The foregoing negotiation before the forwarder and the controller may also be actively initiated by the controller. For example, referring to FIG. 6b, the negotiation specifically includes the following steps:

Step b602: The forwarder receives a capability negotiation request message sent by the controller, where the capability negotiation request message includes a context capability list supported by the controller, so that the forwarder requests, according to the context capability list supported by the controller, some or all contexts that the controller can support from the controller.

Optionally, the foregoing controller may actively send some or all contexts that the forwarder can support to the forwarder; and may also send some or all contexts that the forwarder can support to the forwarder after receiving a flow rule request message and a context request message sent by the forwarder.

Step b604: The forwarder sends a negotiation response message to a controller, where the negotiation response message may include a context capability list supported by the forwarder, so that the controller sends some or all contexts that the forwarder can support to the forwarder.

Figure 7:
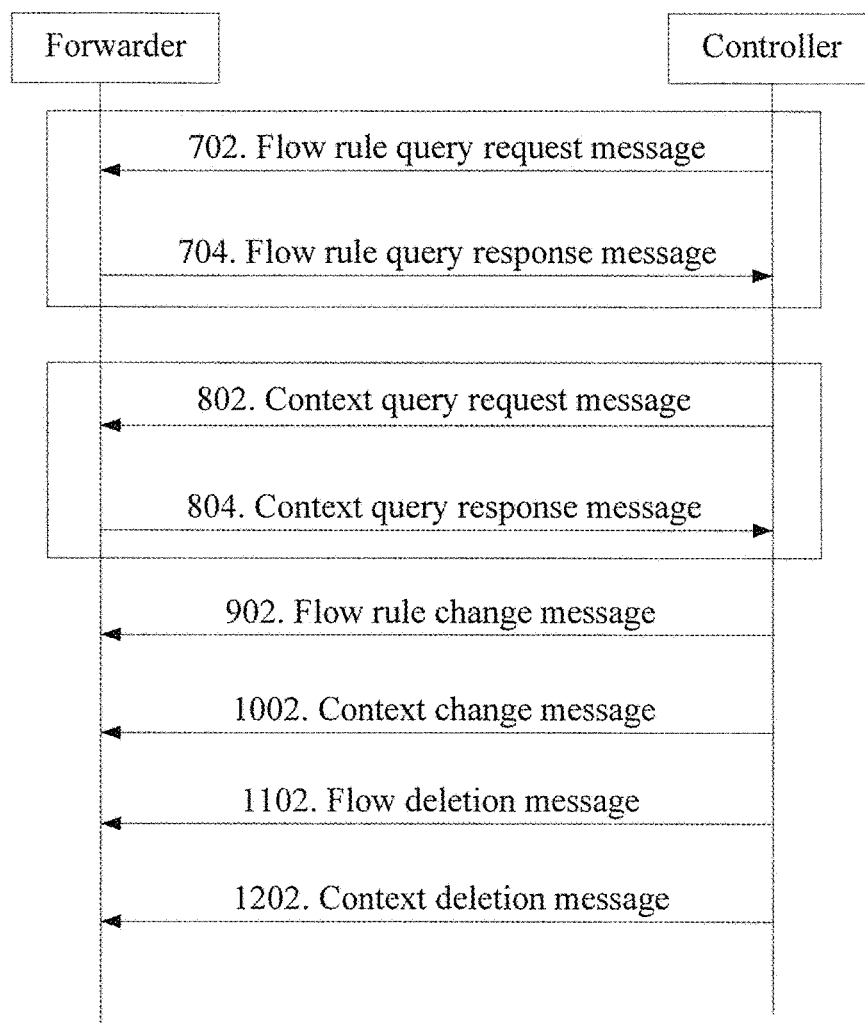
FIG. 7 is a schematic flowchart of a method for querying, changing or deleting information about a flow, a CID set corresponding to a flow or a context corresponding to a CID by a controller according to an embodiment of the present invention.

The controller may manage the first correspondence or the second correspondence stored in the forwarder. For example, referring to FIG. 7, the controller may query, change or delete information in the first correspondence or the second correspondence. Description is performed below by using some examples, and it should be noted that, these examples are all relatively independent, and do not affect each other.

Example 1

If a controller needs to query a CID set corresponding to a flow, the controller sends a flow rule query request message shown in step 702 to a forwarder, and the forwarder performs the following steps:

receiving the flow rule query request message sent by the controller, where the query request message includes information about a to-be-queried flow; and finding a CID set corresponding to the to-be-queried flow according to the first correspondence, and sending a flow rule query response message shown in step 704 to the controller, where the flow rule query response message includes the information about the to-be-queried flow, and the CID set corresponding to the to-be-queried flow.

Example 2

If a controller needs to query contexts corresponding to one or several CIDs, the controller sends a context query request message shown in step 802 to a forwarder, and the forwarder performs the following steps:

receiving the context query request message sent by the controller, where the query request message includes a to-be-queried CID; and there may be one or more to-be-queried CIDs; and finding a context corresponding to the to-be-queried CID according to the second correspondence, and sending a context query response message shown in step 804 to the controller, where the query response message includes the context corresponding to the to-be-queried CID.

Optionally, the foregoing query response message may further include the to-be-queried CID.

Example 3

If a controller needs to change a CID set corresponding to a flow, the controller sends a flow rule change message shown in step 902 to a forwarder, and the forwarder performs the following steps:

receiving the flow rule change message sent by the controller, where the flow change message includes information about a to-be-changed flow, and the to-be-changed flow is corresponding to a new CID set; and changing, after the flow rule change message is received, the CID set corresponding to the to-be-changed flow into the new CID set in the first correspondence.

For example, the forwarder receives the flow rule change message sent by the controller, where the information about the to-be-changed flow included in the flow rule change message is that: for a flow whose source IP address is 10.88.85.55, and whose destination IP address is 10.88.80.56, new CID sets corresponding to the to-be-changed flow are CID1, CID2, and CID5.

If in the first correspondence, CID sets originally corresponding to a flow whose source IP address is 10.88.85.55, and whose destination IP address is 10.88.80.56 are: CID1, CID2, and CID3, after receiving the foregoing flow change message, the forwarder changes the CID sets corresponding to the flow whose source IP address is 10.88.85.55, and whose destination IP address is 10.88.80.56 into CID1, CID2, and CID5.

Example 4

If a controller needs to change contexts corresponding to one or several CIDs, the controller sends a context change message shown in step 1002 to a forwarder, and the forwarder performs the following steps:

receiving the context change message sent by the controller, where the context change message includes a to-be-changed CID, and the to-be-changed context identifier is corresponding to a new context; and changing, after the context change message is received, the context corresponding to the to-be-changed CID into the new context in the second correspondence.

For example, a context originally corresponding to CID1 is Context1a, and if the context change message received by the forwarder includes CID1, and a new context Context1b corresponding to CID1, the forwarder changes the context corresponding to CID1 into Context1b in the second correspondence.

Example 5

If a controller needs to delete information about a flow, the controller sends a flow deletion message shown in step 1102 to a forwarder, and the forwarder performs the following steps:

receiving a flow deletion message sent by the controller, where the flow deletion message includes information about a to-be-deleted flow; and deleting the information about the to-be-deleted flow, and a CID set corresponding to the to-be-deleted flow from the first correspondence.

Optionally, if some or all CIDs corresponding to the deleted flow are not corresponding to other flows, the forwarder may further delete the some or all CIDs corresponding to the deleted flow, and contexts corresponding to the some or all CIDs corresponding to the deleted flow from the second correspondence.

For example, it is assumed that CID sets corresponding to a flow 1 include CID1, and CID2; CID sets corresponding to a flow 2 include CID1, and CID3. After the forwarder deletes information about the flow 1 from the first correspondence, if the forwarder finds that CID2 is only corresponding to the flow 1, the forwarder may further delete a context corresponding to CID2 from the second correspondence. However, CID1 is not only corresponding to the flow 1, but also corresponding to the flow 2, and therefore the forwarder does not delete the context corresponding to CID1.

If after the information about the flow 2 is also deleted, the forwarder finds that CID1 is not corresponding to other flows, the forwarder deletes the context corresponding to CID1 from the second correspondence.

Optionally, the forwarder may further report information about a deleted flow or a CID corresponding to a deleted context to the controller.

Example 6

If the controller needs to delete a context, the controller sends a context deletion message shown in step 1202 to the forwarder, and the forwarder receives the context deletion message sent by the controller, where the context deletion message includes at least one to-be-deleted context identifier; the forwarder deletes the at least one to-be-deleted CID, and a context corresponding to the at least one to-be-deleted CID from the second correspondence.

Optionally, after deleting a context in the second correspondence, the forwarder may further correspondingly change the first correspondence, for example, the controller may further perform the following step:

deleting a CID corresponding to the deleted context from the first correspondence.

Context deletion may cause occurrence of a problem when the forwarder processes the flow corresponding to the CID of the context, and therefore, after deleting the CID corresponding to the deleted context in the first correspondence, the forwarder may further delete information about the flow corresponding to the deleted CID in the first correspondence.

For example, it is assumed that CID sets corresponding to a flow 1 include CID1, and CID2; CID sets corresponding to a flow include CID1, and CID3. After the forwarder deletes CID1 corresponding to the context from the second correspondence, if the forwarder finds that flows corresponding to CID1 include the flow 1 and the flow 2, the forwarder further deletes information about the flow 1 and information about the flow 2 in the first correspondence. Moreover, the forwarder may further delete CID sets separately corresponding to the flow 1 and the flow 2.

Optionally, the forwarder may further report a CID corresponding to a deleted context or information about a deleted flow to the controller.

By using the foregoing example provided in the present invention, the controller may effectively manage the first correspondence and the second correspondence saved in the forwarder.

Any method embodiment described above may be implemented by some or all components in the forwarder shown in FIG. 2.

Through the descriptions of the foregoing embodiments, persons skilled in the art may understand that the present invention may be implemented by using hardware only or by using software and a necessary universal hardware platform. Based on such an understanding, the technical solution of the present invention may be embodied in the form of a computer program product. The computer program product may be stored in a nonvolatile storage medium (which can be a compact disc read-only memory, a USB flash drive, or a removable hard disk). The software product includes a number of instructions that enable a computer device (which can be a personal computer, a receiving end, or a network device) to execute the methods provided in the embodiments of the present invention.

The method for processing a packet and the forwarder in the present invention are introduced in detail above. A person of ordinary skill in the art may, based on the idea of the present invention, make modifications with respect to the specific implementation manners and the application scope. Therefore, the content of this specification shall not be construed as a limitation to the present invention.

What is claimed is:

1. A method for processing a packet in a software-defined network (SDN), wherein the method is performed by a forwarder, and the method comprises:
   receiving an input packet;
   determining a flow to which the input packet belongs according to the input packet;
   determining a context identifier set corresponding to the flow to which the input packet belongs according to a first correspondence between flows and context identifier sets, wherein a context identifier set corresponding to each flow in the first correspondence comprises at least one context identifier;
   determining a context corresponding to the context identifier set according to a second correspondence between context identifiers and contexts;
   processing the input packet according to the context corresponding to the context identifier set;
   wherein when the context identifier set comprises multiple context identifiers, processing the input packet according to the context corresponding to the context identifier set is performed in a preset context sequence; and
   wherein when the preset context sequence comprises a case in which at least two contexts are same in sequence, the forwarder processes the input packet according to both of the at least two contexts.

2. The method according to claim 1, wherein determining the flow to which the input packet belongs according to the input packet comprises:
   determining the flow to which the input packet belongs according to a packet header or content of the input packet.

3. The method according to claim 1, wherein before determining the context identifier set corresponding to the flow to which the input packet belongs according to the first correspondence, the method further comprises:
   determining whether the first correspondence has the context identifier set corresponding to the flow to which the input packet belongs;
   if yes, determining the context identifier set corresponding to the flow to which the input packet belongs according to the first correspondence between flows and context identifier sets; and
   if not:
      sending a flow rule request message to a controller, wherein the flow rule request message comprises a packet header or content of the input packet,
      receiving a flow rule installation message sent by the controller, wherein the flow rule installation message comprises the context identifier set corresponding to the flow of the input packet, and
      adding, to the first correspondence, information about the flow to which the input packet belongs, and the context identifier set corresponding to the flow of the input packet.

4. The method according to claim 3, wherein:
   the flow rule installation message sent by the controller further comprises the context corresponding to the context identifier set; and
   after the forwarder receives the flow rule installation message, if it is found that some or all context identifiers in the context identifier set, and contexts corresponding to the some or all context identifiers in the context identifier set are not stored in the second correspondence, the some or all context identifiers in the context identifier set, and the contexts corresponding to the some or all context identifiers in the context identifier set are added to the second correspondence.

5. The method according to claim 1, wherein before determining the context corresponding to the context identifier set according to the second correspondence between the context identifiers and the contexts, the method further comprises:
   determining whether the second correspondence has the context corresponding to the context identifier set;
   if yes, determining the context corresponding to the context identifier set according to the second correspondence between the context identifiers and the contexts; and
   if some or all context identifiers in the context identifier set have no corresponding context:
      sending a context request message to a controller, wherein the context request message comprises the some or all context identifiers in the context identifier set,
      receiving a context installation message sent by the controller, wherein the context installation message comprises the some or all context identifiers in the context identifier set, and contexts corresponding to the some or all context identifiers in the context identifier set, and
      adding, to the second correspondence, the some or all context identifiers in the context identifier set, and the contexts corresponding to the some or all context identifiers in the context identifier set.

6. The method according to claim 1, wherein the method further comprises:
   receiving a flow deletion message sent by a controller, wherein the flow deletion message comprises information about a to-be-deleted flow; and
   deleting, from the first correspondence, the information about the to-be-deleted flow, and a context identifier set corresponding to the to-be-deleted flow.

7. The method according to claim 6, wherein if some or all context identifiers corresponding to the to-be-deleted flow are not corresponding to other flows, the method further comprises:
   deleting, from the second correspondence, the some or all context identifiers corresponding to the to-be-deleted flow, and contexts corresponding to the some or all context identifiers corresponding to the to-be-deleted flow.

8. The method according to claim 1, wherein the method further comprises:
   receiving a context deletion message sent by a controller, wherein the context deletion message comprises at least one to-be-deleted context identifier; and
   deleting, from the second correspondence, the at least one to-be-deleted context identifier, and a context corresponding to the at least one to-be-deleted context identifier.

9. A forwarder used in a software-defined network (SDN), the forwarder comprising:
- a memory configured to store a first correspondence between flows and context identifier sets, and a second correspondence between context identifiers and contexts, wherein a context identifier set corresponding to each flow in the first correspondence comprises at least one context identifier;
- an interface configured to receive an input packet; and
- a processor configured to:
  - determine a flow to which the input packet belongs according to the input packet,
  - determine a context identifier set corresponding to the flow to which the input packet belongs according to the first correspondence stored in the memory,
  - determine a context corresponding to the context identifier set according to the second correspondence stored in the memory, and
  - process the input packet according to the context corresponding to the context identifier set;
- wherein when the context identifier set comprises multiple context identifiers, the processor is configured to process, in a preset context sequence, the input packet according to the context corresponding to the context identifier set;
- wherein when the preset context sequence comprises a case in which at least two contexts are same in sequence, the processor is further configured to process the input packet according to both of the at least two contexts.

10. The forwarder according to claim 9, wherein the processor is further configured to:
- determine the flow corresponding to the input packet according to a packet header or content of the input packet.

11. The forwarder according to claim 9, wherein:
the interface comprises a receiver and a sender, and the receiver is configured to receive the input packet.

12. The forwarder according to claim 11, wherein:
the processor is further configured to:
- before the context identifier set corresponding to the flow to which the input packet belongs is determined according to the first correspondence stored in the memory, determine whether the first correspondence has the context identifier set corresponding to the flow to which the input packet belongs,
  - if yes, determine the context identifier set corresponding to the flow to which the input packet belongs according to the first correspondence, and
  - if not, notify the sender;
the sender is configured to:
- after a notification from the processor is received, send a flow rule request message to a controller, wherein the flow rule request message comprises a packet header or content of the input packet;
the receiver is further configured to:
- receive a flow rule installation message sent by the controller, wherein the flow rule installation message comprises the context identifier set corresponding to the flow of the input packet; and
the processor is further configured to:
- add, to the first correspondence, information about the flow to which the input packet belongs, and the context identifier set corresponding to the flow of the input packet.

13. The forwarder according to claim 11, wherein:
the processor is further configured to:
- before the context corresponding to the context identifier set corresponding to the flow to which the input packet belongs is determined according to the second correspondence stored in the memory, determine whether the second correspondence has the context corresponding to the context identifier set corresponding to the flow to which the input packet belongs,
  - if yes, determine the context corresponding to the context identifier set according to the second correspondence stored in the memory, and
  - if some or all context identifiers in the context identifier set have no corresponding context, notify the sender;
the sender is configured to:
- send a context request message to a controller, wherein the context request message comprises the some or all context identifiers in the context identifier set corresponding to the flow to which the input packet belongs;
the receiver is further configured to:
- receive a context installation message sent by the controller, wherein the context installation message comprises the some or all context identifiers in the context identifier set, and contexts corresponding to the some or all context identifiers in the context identifier set; and
the processor is further configured to:
- add, to the second correspondence, the some or all context identifiers in the context identifier set, and the contexts corresponding to the some or all context identifiers in the context identifier set.

14. The forwarder according to claim 9, wherein if there are multiple flows to which the input packet belongs, the processor is further configured to:
- obtain a context identifier set corresponding to each flow to which the input packet belongs sequentially according to the first correspondence.

15. The forwarder according to claim 9, wherein:
the receiver is further configured to receive a flow deletion message sent by a controller, wherein the flow deletion message comprises information about a to-be-deleted flow; and
the processor is further configured to delete, from the first correspondence, the information about the to-be-deleted flow, and a context identifier set corresponding to the to-be-deleted flow.

16. The forwarder according to claim 15, wherein the processor is further configured to:
- when it is found that some or all context identifiers corresponding to the to-be-deleted flow are not corresponding to other flows, delete, from the second correspondence, the some or all context identifiers corresponding to the to-be-deleted flow, and contexts corresponding to the some or all context identifiers corresponding to the to-be-deleted flow.

\* \* \* \* \*